(12) United States Patent
Wu et al.

(10) Patent No.: US 12,063,595 B2
(45) Date of Patent: Aug. 13, 2024

(54) NETWORK NODE SELECTION METHOD AND APPARATUS

(71) Applicant: HUAWEI TECHNOLOGIES CO., LTD., Guangdong (CN)

(72) Inventors: Yizhuang Wu, Beijing (CN); Wanqiang Zhang, Beijing (CN); Hui Ni, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 444 days.

(21) Appl. No.: 17/405,208

(22) Filed: Aug. 18, 2021

(65) Prior Publication Data

US 2021/0385744 A1  Dec. 9, 2021

Related U.S. Application Data

(63) Continuation of application No. PCT/CN2020/070078, filed on Jan. 2, 2020.

(30) Foreign Application Priority Data

Feb. 19, 2019 (CN) .......................... 201910123295.4

(51) Int. Cl.
*H04W 48/20* (2009.01)
*H04M 15/00* (2024.01)
(Continued)

(52) U.S. Cl.
CPC ........... *H04W 48/20* (2013.01); *H04M 15/66* (2013.01); *H04W 8/08* (2013.01); *H04W 76/12* (2018.02); *H04W 76/20* (2018.02)

(58) Field of Classification Search
CPC ..... H04W 48/20; H04W 76/12; H04W 76/20; H04W 8/08; H04M 15/66
See application file for complete search history.

(56) References Cited

U.S. PATENT DOCUMENTS

2019/0059067 A1* 2/2019 Lee .................. H04L 67/141
2020/0213912 A1* 7/2020 Shi .................... H04W 36/00

FOREIGN PATENT DOCUMENTS

CN  108323245 A  7/2018
CN  108738086 A  11/2018
(Continued)

OTHER PUBLICATIONS

3GPP TR 23. 737 V0.5.0 (Jan. 2019), 3rd Generation Partnership Project; Technical Specification Group Services and System Aspects; Study on architecture aspects for using satellite access in 5G(Release 16), 36 pages.

(Continued)

*Primary Examiner* — Chandrahas B Patel
(74) *Attorney, Agent, or Firm* — WOMBLE BOND DICKINSON (US) LLP

(57) ABSTRACT

This application provides a network node selection method and apparatus. An SMF network element obtains transmission capability information of an access network device, and selects, for a terminal device based on the transmission capability information of the access network device, a UPF network element that supports at least one transmission capability included in the transmission capability information. In this process, the SMF network element obtains a transmission capability of the access network device, and selects the UPF network element based on the transmission capability of the access network device. The selected UPF network element supports the transmission capability used by the access network device, so that data can be successfully transmitted between the access network device and the UPF network element. Therefore, a data transmission success rate is improved.

20 Claims, 12 Drawing Sheets

(51) Int. Cl.
   *H04W 8/08*    (2009.01)
   *H04W 76/12*   (2018.01)
   *H04W 76/20*   (2018.01)

(56) References Cited

FOREIGN PATENT DOCUMENTS

| | | |
|---|---|---|
| CN | 109246778 A | 1/2019 |
| WO | 2018070436 A1 | 4/2018 |
| WO | 2018236830 A1 | 12/2018 |

OTHER PUBLICATIONS

3GPP TS 23.501 Draft V16.0.0+(Feb. 2019), 3rd Generation Partnership Project; Technical Specification Group Services and System Aspects; System Architecture for the 5G System; Stage 2(Release 16), 281 pages.

3GPP TS 23.502 Draft V16.0.0+ (Feb. 2019), 3rd Generation Partnership Project; Technical Specification Group Services and System Aspects; Procedures for the 5G System; Stage 2(Release 16), 378 pages.

SA WG2 Meeting #130,S2-1900487,Solution for support of correlated PDU sessions via SAT RAN and TER RAN , CATT,Jan. 21-25, 2019, Kochi, India,total 3 pages.

SA WG2 Meeting #124,S2-178275,Fixing the wrong usage of "relocation",Orange ,Nov. 27-Dec. 1, 2017, Reno, Nevada, USA,total 46 pages.

3GPP TS 23.501 V15.4.0:"3rd Generation Partnership Project;Technical Specification Group Services and System Aspects;System Architecture for the 5G System;Stage 2(Release 15)",Dec. 2018,total 236 pages.

* cited by examiner

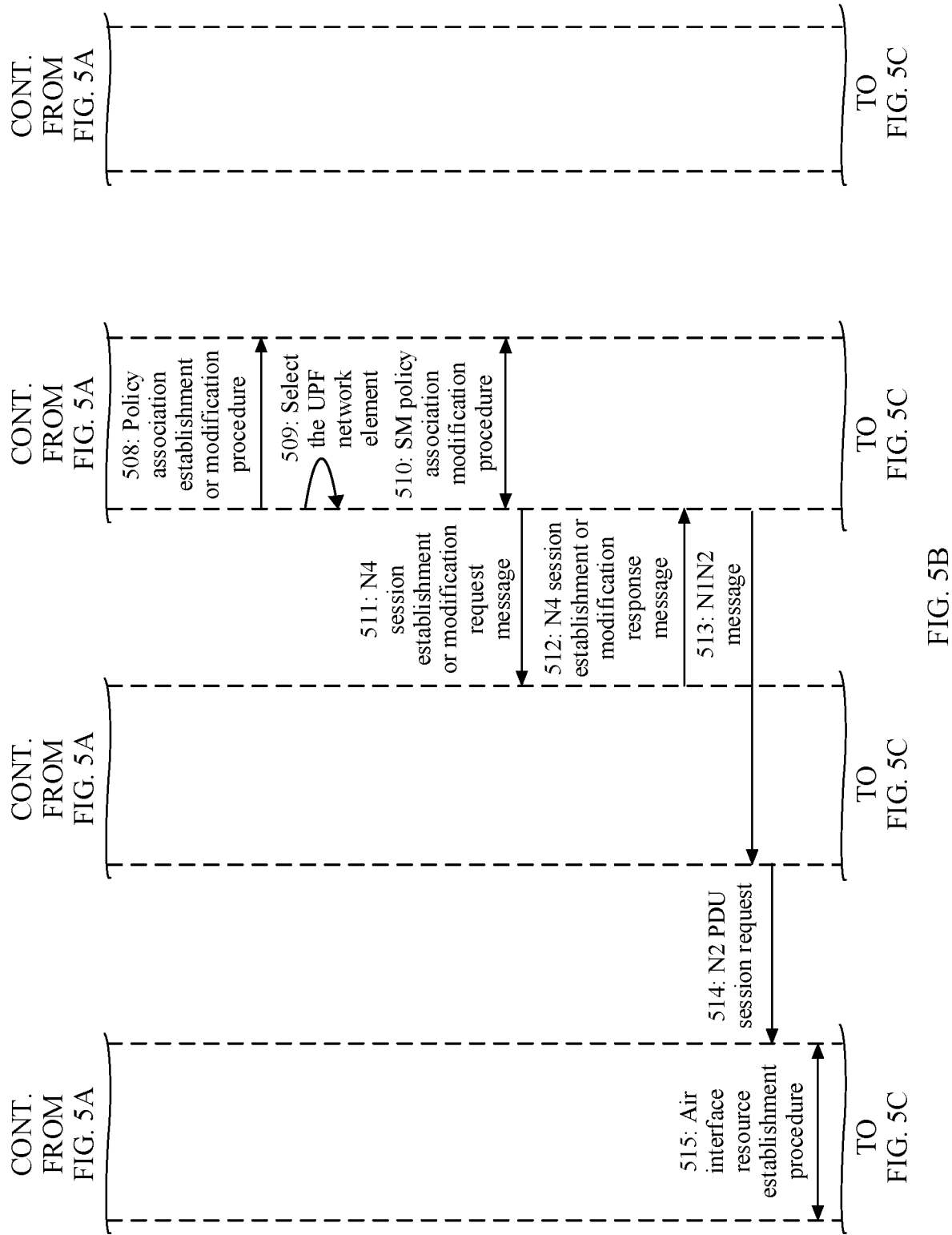

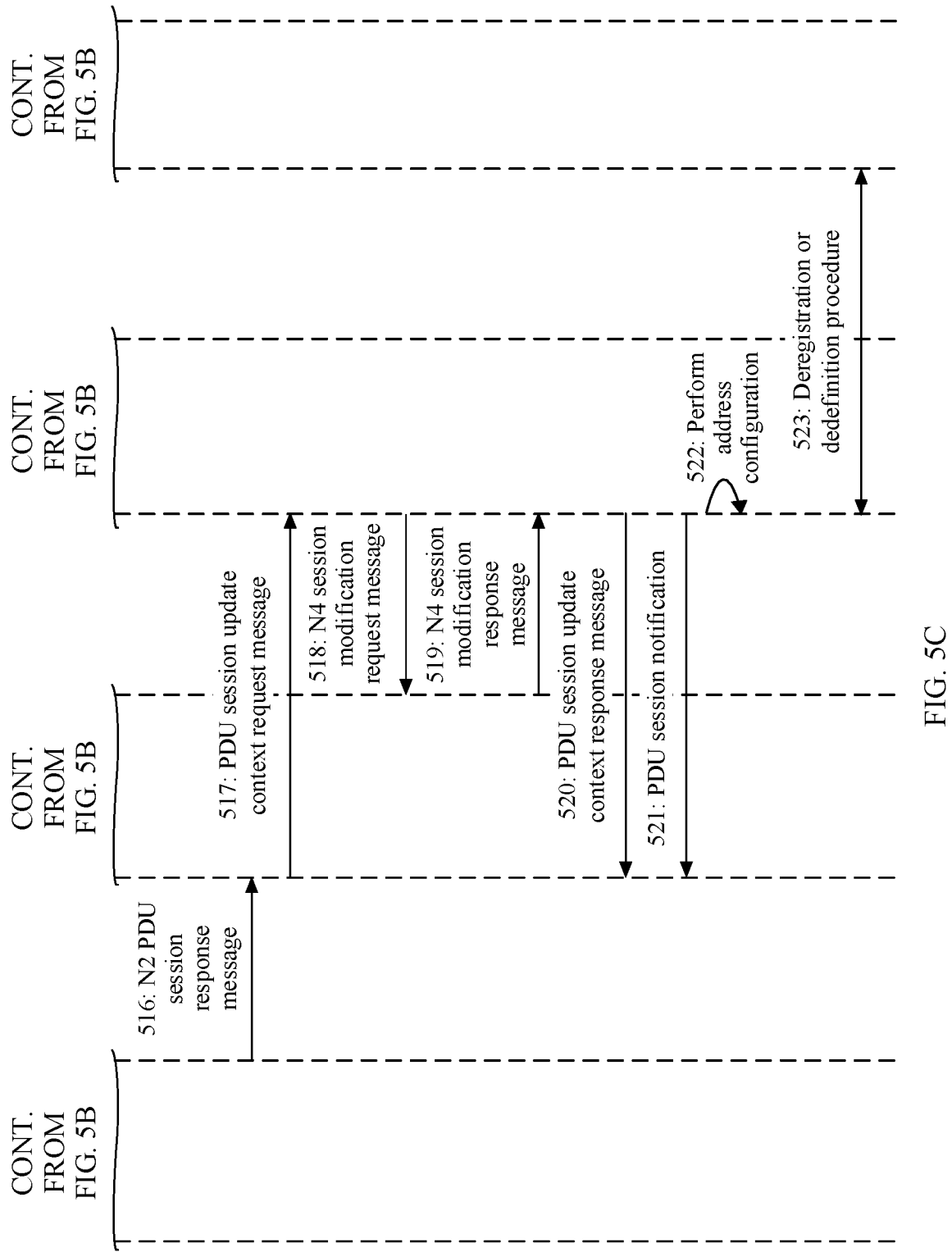

NETWORK NODE SELECTION METHOD AND APPARATUS

CROSS-REFERENCE TO RELATED APPLICATIONS

This application is a continuation of International Application No. PCT/CN2020/070078, filed on Jan. 2, 2020, which claims priority to Chinese Patent Application No. 201910123295.4, filed on Feb. 19, 2019. The disclosures of the aforementioned applications are hereby incorporated by reference in their entireties.

TECHNICAL FIELD

Embodiments of this application relate to the field of communication technologies, and in particular, to a network node selection method and apparatus.

BACKGROUND

In a fifth generation (5G) network architecture, a terminal device communicates with a core network through an access network device. The core network includes an access and mobility management function (AMF) network element, a user plane function (UPF) network element, a session management function (SMF) network element, or the like.

However, a transmission capability of the access network device is not always equivalent to a transmission capability of the UPF network element, that is, a transmission capability supported by the access network device is not supported by the UPF network element. For example, in a 5G network architecture based on satellite communication, satellite communication may be used as a backup transmission manner in a scenario or a transmission manner of a service. For uplink data transmission, a terminal device sends data to a terrestrial access network device, then the terrestrial access network device sends the data to a satellite, and finally, the satellite sends the data to a UPF network element. For downlink data transmission, data is sent by the UPF network element to the satellite, the satellite sends the data to the terrestrial access network device, and the terrestrial access network device sends the data to the terminal device. In uplink and downlink user data transmission processes, the UPF network element is used to forward the data. In this case, both the UPF network element and the access network device need to support a satellite communication capability. However, among a plurality of UPF network elements deployed in a same area, only some UPF network elements may support satellite communication. When satellite communication is used as a backhaul link, an SMF network element selects a UPF network element based on a location of the terminal device. If the selected UPF network element does not support satellite communication, data transmission fails.

Therefore, when a transmission capability is used to transmit data, how to select a UPF network element supporting the transmission capability is a problem urgently to be resolved in the industry.

SUMMARY

Embodiments of this application provide a network node selection method and apparatus. An SMF network element obtains a transmission capability of an access network device, and selects a UPF network element based on the transmission capability of the access network device. The selected UPF network element supports the transmission capability used by the access network device, so that data can be successfully transmitted between the access network device and the UPF network element. Therefore, a data transmission success rate is improved.

According to a first aspect, an embodiment of this application provides a network node selection method. The method may be applied to an SMF network element, or may be applied to a chip in the SMF network element. The following describes the method by using an example in which the method is applied to the SMF network element. The method includes: The session management function SMF network element obtains transmission capability information of an access network device, where the transmission capability information includes at least one transmission capability; the SMF network element selects a user plane function UPF network element for a terminal device based on the transmission capability information of the access network device, where the access network device is an access network device that serves the terminal device. In this solution, the SMF network element obtains the transmission capability of the access network device, and selects the UPF network element based on the transmission capability of the access network device. The selected UPF network element supports the transmission capability used by the access network device, so that data can be successfully transmitted between the access network device and the UPF network element. Therefore, a data transmission success rate is improved.

In an embodiment, that the SMF network element obtains transmission capability information of an access network device includes: The SMF network element receives the transmission capability information of the access network device from an access and mobility management function AMF network element; or the SMF network element receives the transmission capability information of the access network device from the terminal device. In this solution, the transmission capability information of the access network device received by the SMF network element is obtained by the AMF network element and sent to the SMF network element, or is obtained by the terminal device and sent to the SMF network element, so that the SMF network element flexibly obtains the transmission capability information of the access network device.

In an embodiment, that the SMF network element receives the transmission capability information of the access network device from an access and mobility management function AMF network element includes: The SMF network element receives a packet data unit PDU session management message from the AMF network element, where the PDU session management message carries the transmission capability information of the access network device, and the access network device is an access network device that serves the terminal device; or the SMF network element receives an N11 message from the AMF network element, where the N11 message carries the transmission capability information of the access network device, and the access network device is an access network device that satisfies a preset condition. In this solution, the AMF network element sends the transmission capability information of the access network device to the SMF network element by using the PDU session management message, to satisfy a UE-level or PDU session-level scenario; or the AMF network element sends the transmission capability information of the access network device to the SMF network element by using the N11 message, to satisfy a node-level scenario.

In an embodiment, that the SMF network element receives the transmission capability information of the access network device from the terminal device includes: The SMF network element receives a non-access stratum NAS message from the terminal device, where the NAS message carries the transmission capability information of the access network device. In this solution, the SMF network element obtains the transmission capability information of the access network device from the terminal device.

In an embodiment, that the SMF network element selects a user plane function UPF network element for a terminal device based on the transmission capability information of the access network device includes: The SMF network element selects the UPF network element for the terminal device based on a local policy and the transmission capability information of the access network device. In this solution, the SMF network element selects the UPF network element according to the policy of the SMF network element, to satisfy a scenario in which no PCF network element is deployed in a system architecture.

In an embodiment, that the SMF network element selects a user plane function UPF network element for a terminal device based on the transmission capability information of the access network device includes: The SMF network element sends the transmission capability information of the access network device to a policy control function PCF network element, where the transmission capability information is used by the PCF network element to determine a target transmission capability; the SMF network element receives first indication information from the PCF network element, where the first indication information is used to indicate the target transmission capability; the SMF network element selects the UPF network element for the terminal device based on the target transmission capability. In this solution, the PCF network element determines the target transmission capability and indicates the target transmission capability to the SMF network element, so that the SMF network element selects the UPF network element based on the target transmission capability, to satisfy a scenario in which the PCF network element is deployed in a system architecture.

In an embodiment, that the SMF network element selects the UPF network element for the terminal device based on the target transmission capability includes: The SMF network element obtains transmission capability information of at least one UPF network element; the SMF network element selects, for the terminal device based on the transmission capability information of the at least one UPF network element, the UPF network element that supports the target transmission capability. In this solution, the SMF network element selects one UPF network element that supports the target transmission capability from a plurality of UPF network elements.

In an embodiment, that the SMF network element obtains transmission capability information of at least one UPF network element includes: The SMF network element sends a subscription request to a network repository function NRF network element, where the subscription request is used to request information about the UPF network element, and the information about the UPF network element includes the transmission capability information of the UPF network element; the SMF network element receives the information about the UPF network element from the NRF network element. In this solution, the SMF network element obtains the transmission capability information of the UPF network element through the NRF network element.

In an embodiment, the subscription request carries preset transmission capability information, and the UPF network element is a UPF network element that is in at least one UPF network element managed by the SMF network element and that supports a transmission capability indicated by the preset transmission capability information. In this solution, the SMF network element obtains the UPF network element that supports the preset transmission capability.

In an embodiment, that the SMF network element obtains transmission capability information of at least one UPF network element includes: The SMF network element sends an N4 request message to the UPF network element, and receives an N4 response message from the UPF network element, where the N4 response message carries the transmission capability information of the UPF network element; or the SMF network element receives an N4 request message from the UPF network element, where the N4 request message carries the transmission capability information of the UPF network element. In this solution, the SMF network element obtains the transmission capability information of the UPF network element by performing an N4 node-level procedure with the UPF network element.

In an embodiment, the method further includes: The SMF network element sends second indication information to the access network device based on the transmission capability information of the access network device, where the second indication information is used to indicate the access network device to send an access control message to the terminal device; or the SMF network element receives access control policy information from the PCF network element, and sends second indication information to the access network device based on the access control policy information, where the second indication information is used to indicate the access network device to send an access control message to the terminal device. In this solution, after receiving the transmission capability information of the access network device, the SMF network element determines the second indication information; or receives an access control policy of the PCF network element, determines the second indication information according to the access control policy, and sends the second indication information to the access network device, so that the access network device controls access of the terminal device based on the second indication information, to control access of the terminal device based on the transmission capability of the access network device.

According to a second aspect, an embodiment of this application provides a network node selection method. The method may be applied to an AMF network element, or may be applied to a chip in the AMF network element. The following describes the method by using an example in which the method is applied to the AMF network element. The method includes: The access and mobility management function AMF network element obtains transmission capability information of an access network device, where the transmission capability information includes at least one transmission capability; the AMF network element sends the transmission capability information to a session management function SMF network element. In this solution, the AMF network element obtains the transmission capability information of the access network device and sends the transmission capability information to the SMF network element, to select a UPF network element based on the transmission capability of the access network device. The selected UPF network element supports the transmission capability used by the access network device, so that data can be successfully transmitted between the access network device and the UPF network element. Therefore, a data transmission success rate is improved.

In an embodiment, the method further includes: The AMF network element selects the SMF network element based on the transmission capability information of the access network device. In this solution, the AMF network element selects the proper SMF network element, and the UPF network element that supports the transmission capability in the transmission capability information exists in at least one UPF network element managed by the SMF network element.

In an embodiment, that the AMF network element selects the SMF network element based on the transmission capability information of the access network device includes: The AMF network element sends the transmission capability information of the access network device to a network repository function NRF network element, where the transmission capability information of the access network device is used by the NRF network element to determine at least one target SMF network element; the AMF network element receives third indication information from the NRF network element, where the third indication information is used to indicate the at least one target SMF network element; the AMF network element determines the SMF network element in the at least one target SMF network element. In this solution, the NRF selects a plurality of target SMF network elements that support the transmission capability in the transmission capability information, and indicates the plurality of target SMF network elements to the AMF network element by using the third indication information, so that the AMF network element determines one SMF network element in the plurality of target SMF network elements.

In an embodiment, that the AMF network element sends the transmission capability information to a session management function SMF network element includes: The AMF network element sends a PDU session management message to the SMF network element, where the PDU session management message carries a PDU session establishment request and the transmission capability information of the access network device, the PDU session establishment request is used to request to establish a PDU session for a terminal device, and the access network device is an access network device that serves the terminal device. In this solution, the AMF network element sends the transmission capability information of the access network device to the SMF network element by using the PDU session management message, to satisfy a UE-level or PDU session-level scenario.

In an embodiment, that the AMF network element obtains transmission capability information of an access network device includes: The AMF network element receives the transmission capability information from the access network device; or the AMF network element receives an identifier of the access network device from the access network device, and obtains the transmission capability information of the access network device based on the identifier of the access network device; or the AMF network element obtains transport layer association information of the access network device, and obtains the transmission capability information of the access network device based on the transport layer association information; or the AMF network element obtains location information of the terminal device, and obtains the transmission capability information of the access network device based on the location information, where the access network device is an access network device that serves the terminal device. In this solution, the AMF network element may obtain the transmission capability information of the access network device from the AMF network element locally or another network element in a registration process or a PDU session establishment process of the terminal device, to flexibly obtain the transmission capability information of the access network device.

In an embodiment, that the AMF network element obtains transmission capability information of an access network device includes: When the access network device satisfies a preset condition, the AMF network element obtains the transmission capability information of the access network device. In this solution, the access network device actively reports the transmission capability information, and this solution is mainly applied to a node-level scenario.

According to a third aspect, an embodiment of this application provides a network node selection method. The method may be applied to a terminal device, or may be applied to a chip in the terminal device. The following describes the method by using an example in which the method is applied to the terminal device. The method includes: The terminal device receives transmission capability information of an access network device; the terminal device sends the transmission capability information to a session management function SMF network element. In this solution, the terminal device obtains the transmission capability information of the access network device and sends the transmission capability information to the SMF network element, to select a UPF network element based on a transmission capability of the access network device. The selected UPF network element supports the transmission capability used by the access network device, so that data can be successfully transmitted between the access network device and the UPF network element. Therefore, a data transmission success rate is improved.

In an embodiment, that the terminal device receives transmission capability information of an access network device includes: the terminal device receives the transmission capability information from the access network device or an access and mobility management function AMF network element. In this solution, the terminal device may obtain the transmission capability information from the access network device or the AMF network element, to flexibly obtain the transmission capability information.

In an embodiment, that the terminal device sends the transmission capability information to a session management function SMF network element includes: The terminal device sends a non-access stratum NAS message to the SMF network element, where the NAS message carries the transmission capability information. In this solution, the terminal device sends the transmission capability information of the access network device to the SMF network element.

According to a fourth aspect, an embodiment of this application provides a network node selection method, including: A policy control function PCF network element receives transmission capability information of an access network device from a session management function SMF network element; the PCF network element determines a target transmission capability based on the transmission capability information; the PCF network element sends first indication information to the SMF network element, where the first indication information is used to indicate the target transmission capability. In this solution, when the PCF network element is deployed in a system architecture, the PCF network element selects the target transmission capability.

In an embodiment, after the PCF network element sends the first indication information to the SMF network element, the method further includes: The PCF network element sends access control policy information to the SMF network element. In this solution, after receiving the transmission capability information, the SMF network element sends the transmission capability information to the PCF network element, and the PCF network element determines the access control policy information and sends the access control policy information to the access network device, so that the access network device controls access of a terminal device based on the access policy control information. Therefore, access of the terminal device is controlled based on a transmission capability of the access network device.

According to a fifth aspect, an embodiment of this application provides a network node selection apparatus. The apparatus may be an SMF network element, or may be a chip in the SMF network element. The apparatus may include a processing unit, a sending unit, and a receiving unit. When the apparatus is the SMF network element, the processing unit may be a processor, the sending unit may be a transmitter, and the receiving unit may be a receiver. The SMF network element may further include a storage unit, and the storage unit may be a memory. The storage unit is configured to store instructions, and the processing unit executes the instructions stored in the storage unit, so that the SMF network element implements a function in the first aspect or the embodiments of the first aspect. When the apparatus is the chip in the SMF network element, the processing unit may be a processor, and the sending unit and the receiving unit may be an input/output interface, a pin, a circuit, or the like. The processing unit executes instructions stored in a storage unit, so that the SMF network element implements a function in the first aspect or the embodiments of the first aspect. The storage unit may be a storage unit (for example, a register or a cache) inside the chip, or may be a storage unit (for example, a read-only memory or a random access memory) that is located outside the chip and that is inside the SMF network element.

According to a sixth aspect, an embodiment of this application provides a network node selection apparatus. The apparatus may be an AMF network element, or may be a chip in the AMF network element. The apparatus may include a processing unit, a sending unit, and a receiving unit. When the apparatus is the AMF network element, the processing unit may be a processor, the sending unit may be a transmitter, and the receiving unit may be a receiver. The AMF network element may further include a storage unit, and the storage unit may be a memory. The storage unit is configured to store instructions, and the processing unit executes the instructions stored in the storage unit, so that the AMF network element implements a function in the second aspect or the embodiments of the second aspect. When the apparatus is the chip in the AMF network element, the processing unit may be a processor, and the sending unit and the receiving unit may be an input/output interface, a pin, a circuit, or the like. The processing unit executes instructions stored in a storage unit, so that the AMF network element implements a function in the second aspect or the embodiments of the second aspect. The storage unit may be a storage unit (for example, a register or a cache) inside the chip, or may be a storage unit (for example, a read-only memory or a random access memory) that is located outside the chip and that is inside the AMF network element.

According to a seventh aspect, an embodiment of this application provides a network node selection apparatus. The apparatus may be a terminal device, or may be a chip in the terminal device. The apparatus may include a processing unit, a sending unit, and a receiving unit. When the apparatus is the terminal device, the processing unit may be a processor, the sending unit may be a transmitter, and the receiving unit may be a receiver. The terminal device may further include a storage unit, and the storage unit may be a memory. The storage unit is configured to store instructions, and the processing unit executes the instructions stored in the storage unit, so that the terminal device implements a function in the third aspect or the embodiments of the third aspect. When the apparatus is the chip in the terminal device, the processing unit may be a processor, and the sending unit and the receiving unit may be an input/output interface, a pin, a circuit, or the like. The processing unit executes instructions stored in a storage unit, so that the terminal device implements a function in the third aspect or the embodiments of the third aspect. The storage unit may be a storage unit (for example, a register or a cache) inside the chip, or may be a storage unit (for example, a read-only memory or a random access memory) that is located outside the chip and that is inside the terminal device.

According to an eighth aspect, an embodiment of this application provides a network node selection apparatus. The apparatus may be a PCF network element, or may be a chip in the PCF network element. The apparatus may include a processing unit, a sending unit, and a receiving unit. When the apparatus is the PCF network element, the processing unit may be a processor, the sending unit may be a transmitter, and the receiving unit may be a receiver. The PCF network element may further include a storage unit, and the storage unit may be a memory. The storage unit is configured to store instructions, and the processing unit executes the instructions stored in the storage unit, so that the PCF network element implements a function in the fourth aspect or the embodiments of the fourth aspect. When the apparatus is the chip in the PCF network element, the processing unit may be a processor, and the sending unit and the receiving unit may be an input/output interface, a pin, a circuit, or the like. The processing unit executes instructions stored in a storage unit, so that the PCF network element implements a function in the fourth aspect or the embodiments of the fourth aspect. The storage unit may be a storage unit (for example, a register or a cache) inside the chip, or may be a storage unit (for example, a read-only memory or a random access memory) that is located outside the chip and that is inside the PCF network element.

According to a ninth aspect, an embodiment of this application provides a computer program product including instructions. When the computer program product runs on an SMF network element, the SMF network element is enabled to perform the method in the first aspect or the embodiments of the first aspect.

According to a tenth aspect, an embodiment of this application provides a computer program product including instructions. When the computer program product runs on an AMF network element, the AMF network element is enabled to perform the method in the second aspect or the embodiments of the second aspect.

According to an eleventh aspect, an embodiment of this application provides a computer program product including instructions. When the computer program product runs on a terminal device, the terminal device is enabled to perform the method in the third aspect or the embodiments of the third aspect.

According to a twelfth aspect, an embodiment of this application provides a computer program product including instructions. When the computer program product runs on a PCF network element, the PCF network element is enabled to perform the method in the fourth aspect or the embodiments of the fourth aspect.

According to a thirteenth aspect, an embodiment of this application provides a computer-readable storage medium. The computer-readable storage medium stores instructions. When the instructions are run on an SMF network element, the SMF network element is enabled to perform the method in the first aspect or the embodiments of the first aspect.

According to a fourteenth aspect, an embodiment of this application provides a computer-readable storage medium. The computer-readable storage medium stores instructions. When the instructions are run on an AMF network element, the AMF network element is enabled to perform the method in the second aspect or the embodiments of the second aspect.

According to a fifteenth aspect, an embodiment of this application provides a computer-readable storage medium. The computer-readable storage medium stores instructions. When the instructions are run on a terminal device, the terminal device is enabled to perform the method in the third aspect or the embodiments of the third aspect.

According to a sixteenth aspect, an embodiment of this application provides a computer-readable storage medium. The computer-readable storage medium stores instructions. When the instructions are run on a PCF network element, the PCF network element is enabled to perform the method in the fourth aspect or the embodiments of the fourth aspect.

According to the network node selection method and apparatus provided in the embodiments of this application, an SMF network element obtains transmission capability information of an access network device, and selects, for a terminal device based on the transmission capability information of the access network device, a UPF network element that supports at least one transmission capability included in the transmission capability information. In this process, the SMF network element obtains the transmission capability of the access network device, and selects the UPF network element based on the transmission capability of the access network device. The selected UPF network element supports the transmission capability used by the access network device, so that data can be successfully transmitted between the access network device and the UPF network element. Therefore, a data transmission success rate is improved.

BRIEF DESCRIPTION OF DRAWINGS

FIG. 5A, FIG. 5B, and FIG. 5C are still another flowchart of a network node selection method according to an embodiment of this application;

DESCRIPTION OF EMBODIMENTS

Figure 1A:
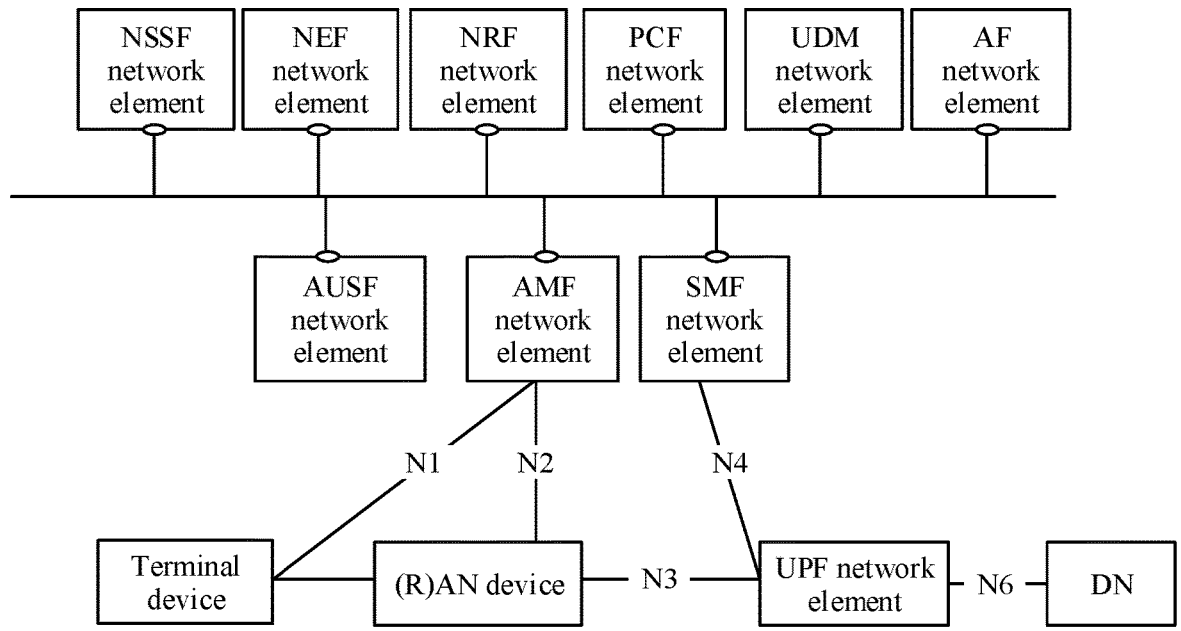
FIG. 1A is a schematic diagram of an architecture of a service-based 5G system to which an embodiment of this application is applicable.

In a 5G network architecture, a terminal device accesses a data network (DN) by using a packet data unit (PDU) session established between the terminal device and the data network. When establishing the PDU session, an SMF network element selects a UPF network element to establish the PDU session. Then, in an uplink data sending process, after receiving data from the terminal device, an access network device that serves the terminal device sends the data to the UPF network element. In a downlink data sending process, after data sent by the UPF network element arrives at the access network device that serves the terminal device, the access network device sends the data to the terminal device.

When the UPF network element is used to send data, if a transmission capability needs to be used to transmit the data between the access network device and the UPF network element, both the access network device and the UPF network element need to support the transmission capability. However, a transmission capability of the access network device is not always equivalent to a transmission capability of the UPF network element, that is, a transmission capability supported by the access network device is not supported by the UPF network element. For example, in a 5G network architecture based on satellite communication, satellite communication is used as a backhaul link. For uplink data transmission, a terminal device sends data to a terrestrial access network device, then the terrestrial access network device sends the data to a satellite, and finally, the satellite sends the data to a UPF network element. For downlink data transmission, data is sent by the UPF network element to the satellite, the satellite sends the data to the terrestrial access network device, and the terrestrial access network device sends the data to the terminal device. In the uplink and downlink data transmission processes, both the access network device and the UPF network element need to have a satellite communication transmission capability. However, in a plurality of UPF network elements in an area, only some UPF network elements may have the satellite communication transmission capability. An SMF network element selects a UPF network element based on a location of the terminal device. If the selected UPF network element does not support satellite communication, data transmission fails.

In view of this, embodiments of this application provide a network node selection method and apparatus. An SMF network element obtains a transmission capability of an access network device, and selects a UPF network element based on the transmission capability of the access network device. The selected UPF network element supports the transmission capability used by the access network device, so that data can be successfully transmitted between the access network device and the UPF network element. Therefore, a data transmission success rate is improved.

In the embodiments of this application, the word such as "example" or "for example" is used to give an example, an illustration, or a description. Any embodiment or design scheme described as an "example" or "for example" in the embodiments of this application should not be explained as being preferable or having more advantages than another embodiment or design scheme. Exactly, use of the word such as "example" or "for example" is intended to present a relative concept in a manner.

A communication method provided in the embodiments of this application may be applied to a 3rd generation (3G) mobile communication system, a long term evolution (LTE) system, a 4th generation (4G) mobile communication system, a long term evolution-advanced (LTE-A) system, a cellular system related to the 3rd generation partnership project (3GPP), a 5th generation (5G) mobile communication system, and a subsequent evolved communication system.

An access network device in the embodiments of this application is a device that provides an access service for a terminal device, and includes a radio access network (RAN) device and an access network (AN) device. The RAN device is mainly a radio network device in a 3rd generation partnership project (3GPP) network, and the AN device may be an access network device defined by non-3GPP. The RAN device is mainly responsible for functions on an air interface side, such as radio resource management, quality of service (QoS) management, and data compression and encryption. The RAN device may include base stations in various forms, such as a macro base station, a micro base station (also referred to as a small cell), a relay station, and an access point. In systems using different radio access technologies, names of devices having a base station function may be different. For example, in a 5G network architecture, the device is referred to as a RAN device or a gNB (5G NodeB); in a long term evolution (LTE) network architecture, the device is referred to as an evolved NodeB (eNB, or eNodeB); or in a third generation (3rd generation, 3G) network architecture, the device is referred to as a NodeB (Node B). The AN device allows a terminal device to connect to and communicate with a 3GPP core network by using a non-3GPP technology. The non-3GPP technology is, for example, a wireless fidelity (Wi-Fi) technology, a worldwide interoperability for microwave access (WiMAX) technology, or a code division multiple access (CDMA) technology.

A terminal device in the embodiments of this application may be user equipment (UE), a handheld terminal, a notebook computer, a subscriber unit, a cellular phone, a smartphone, a wireless data card, a personal digital assistant (PDA) computer, a tablet computer, a wireless modem, a handheld device, a laptop computer, a cordless phone, a wireless local loop (WLL) station, a machine type communication (MTC) terminal, or another device that can access a network. The terminal device and the access network device communicate with each other by using a particular air interface technology.

A transmission capability in the embodiments of this application includes a type of a transmission network (also referred to as a property of the transmission network) between an access network device and a user plane function network element, or a transmission latency, a bandwidth, a capacity, or the like between the access network device and the user plane function network element. When the transmission capability includes the transmission network type supported by the access network device, the transmission capability includes but is not limited to optical fiber communication transmission, 5G new radio (NR) technology communication transmission, satellite communication transmission, and the like. Satellite communication transmission includes low earth orbit (LEO) satellite communication transmission, medium earth orbit (MEO) satellite communication transmission, geostationary earth orbit (GEO) satellite communication transmission, and the like. Generally, only when both the access network device and the UPF network element have a transmission capability, the access network device and the UPF network element can transmit data by using the transmission capability. That is, the access network device and the UPF network element transmit data by using the transmission capability.

The following describes, by using a 5G network architecture as an example, in detail a network architecture to which the network node selection method described in the embodiments of this application is applicable.

Figure 1B:
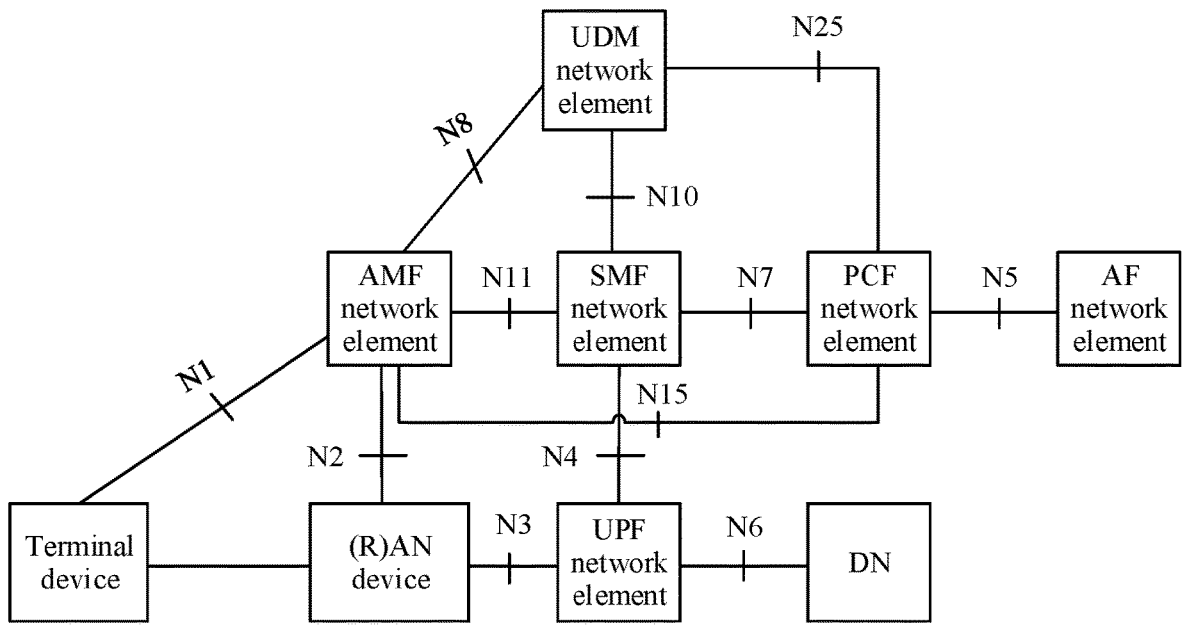
FIG. 1B is a schematic diagram of an architecture of a reference point-based non-roaming 5G system to which an embodiment of this application is applicable.

FIG. 1A is a schematic diagram of an architecture of a service-based 5G system to which an embodiment of this application is applicable, and FIG. 1B is a schematic diagram of an architecture of a reference point-based non-roaming 5G system to which an embodiment of this application is applicable. Referring to FIG. 1A and FIG. 1B, the architecture of the 5G system is divided into an access network part and a core network part. The access network part includes a RAN device, configured to implement a radio access-related function. Key logical network elements included in the core network part include an AMF network element, a UPF network element, an SMF network element, a policy control function (PCF) network element, a unified data management (UDM) network element, and the like. In addition, the 5G network further includes an application function (AF) network element, a network slice selection function (NSSF) network element, an authentication service function (AUSF) network element, a network exposure function (NEF) network element, a network repository function (NEF) network element, an authentication server function (AUSF) network element, and the like. N1 to N25 (if any) indicate messages, for example, an N11 message between the AMF network element and the SMF network element. Functions of some main network elements are described in detail below.

The AMF network element is mainly responsible for mobility management in a mobile network, such as user location update, registration of a user with a network, and user switching.

The SMF network element is mainly responsible for session management in a mobile network, such as session establishment, modification, and release, and has functions such as assigning an IP address to a user, selecting a UPF network element that provides a data forwarding function, and the like.

The UPF network element is responsible for forwarding and receiving user data in a terminal device. The UPF network element may receive the user data from a data network, and transmit the user data to the terminal device through an access network device. Alternatively, the UPF network element may receive the user data from the terminal device through the access network device, and forward the user data to the data network. A transmission resource and a scheduling function in the UPF network element that serves the terminal device are managed and controlled by the SMF network element.

The AF network element mainly supports interacting with a 3GPP core network to provide a service, for example, affecting a data routing decision and a policy control function, or providing some third-party services for a network side.

The UDM network element is configured to generate an authentication credential, process a subscriber identifier (for example, store and manage a subscription permanent identifier), control access authorization, manage subscription data, and the like.

The data network is a service network that provides, for a user, a data transmission service, such as an IP multimedia service (IMS) and the Internet.

Figure 2:
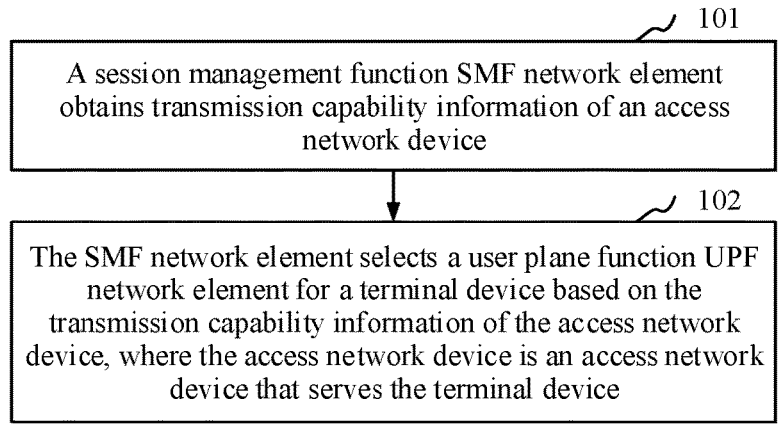
FIG. 2 is a flowchart of a network node selection method according to an embodiment of this application.

Based on the system architectures shown in FIG. 1A and FIG. 1B, the network node selection method is described in detail below by using a transmission capability as a satellite communication capability. For example, FIG. 2 is a flowchart of a network node selection method according to an embodiment of this application. In an embodiment, the network node selection method in this application is described in detail from a perspective of an SMF network element. An embodiment includes the following operations.

101: The session management function SMF network element obtains transmission capability information of an access network device.

In this operation, the SMF network element obtains the transmission capability information of the access network device through an AMF network element or the like.

102: The SMF network element selects a user plane function UPF network element for a terminal device based on the transmission capability information of the access network device, where the access network device is an access network device that serves the terminal device.

For example, the SMF network element manages a plurality of UPF network elements, and the SMF network element may obtain a transmission capability of each of the UPF network elements. After receiving the transmission capability information of the access network device, the SMF network element may select, from the plurality of UPF network elements based on a transmission capability included in the transmission capability information of the access network device, a UPF network element having the transmission capability included in the transmission capability information. For example, the transmission capability information of the access network device received by the SMF network element includes a transmission capability that supports satellite communication transmission. If the SMF network element manages 10 UPF network elements, the SMF network element selects, from the 10 UPF network elements, a UPF network element that supports satellite communication transmission. For another example, the transmission capability information of the access network device received by the SMF network element includes two transmission capabilities: supporting LEO satellite communication transmission and GEO communication transmission. The SMF network element determines, according to a local policy, that a PDU session uses LEO satellite communication transmission. Further, the SMF network element selects a UPF network element that supports LEO satellite communication transmission from 10 UPF network elements managed by the SMF network element.

In an embodiment, the SMF network element obtains the transmission capability information of the access network device, and selects, for the terminal device based on the transmission capability information of the access network device, the UPF network element that supports at least one transmission capability included in the transmission capability information. In this process, the SMF network element obtains the transmission capability of the access network device, and selects the UPF network element based on the transmission capability of the access network device. The selected UPF network element supports the transmission capability used by the access network device, so that data can be successfully transmitted between the access network device and the UPF network element. Therefore, a data transmission success rate is improved.

The following describes in detail how the SMF network element obtains the transmission capability information of the access network device. For example, refer to FIG. 3A and FIG. 3B.

Figure 3A:
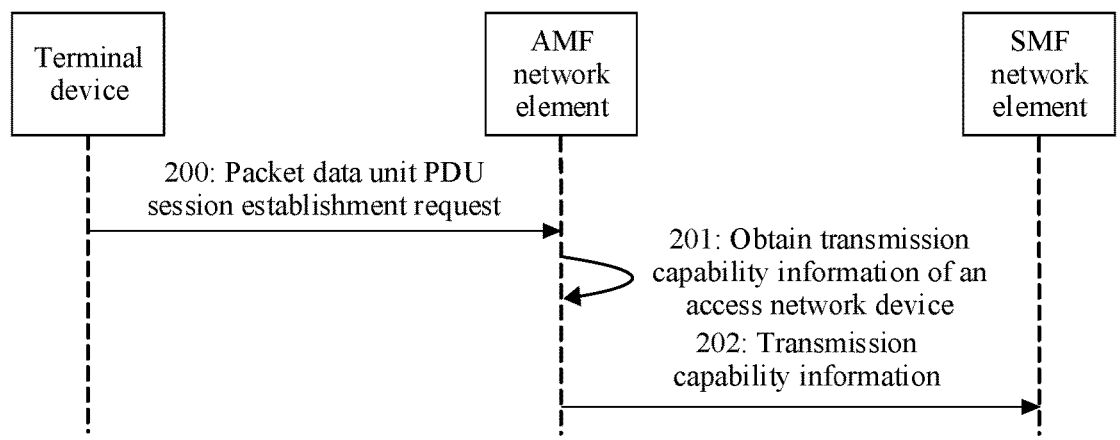
FIG. 3A is a schematic diagram of receiving transmission capability information by an SMF network element in a network node selection method according to an embodiment of this application.

FIG. 3A is a schematic diagram of receiving transmission capability information by an SMF network element in a network node selection method according to an embodiment of this application. Referring to FIG. 3A, an embodiment includes the following operations.

201: An AMF network element obtains transmission capability information of an access network device.

For example, when receiving a PDU session establishment request from a terminal device, the AMF network element obtains the transmission capability information of the access network device that serves the terminal device; or when the access network device is faulty, the AMF network element obtains the transmission capability information of the faulty access network device.

202: The AMF network element sends the transmission capability information to a session management function SMF network element.

Correspondingly, the SMF network element receives the transmission capability information of the access network device from the AMF network element.

The following describes in detail how the AMF network element sends the transmission capability information to the SMF network element in operation 202.

In an embodiment, the AMF network element sends the transmission capability information of the access network device to the SMF network element by using a PDU session management message. This design may be understood as a UE-level or PDU session-level scenario. In this design, before operation 201 in FIG. 3A, the method further includes:

200: The AMF network element receives a packet data unit PDU session establishment request from the terminal device.

When receiving the PDU session establishment request from the terminal device, the AMF network element obtains related information of the access network device, for example, an identifier of the access network device, that serves the terminal device. In this case, in operation 201, the AMF network element obtains the transmission capability information of the access network device based on the PDU session establishment request, where the access network device is an access network device that serves the terminal device that initiates the PDU session establishment request. In operation 202, the AMF network element sends the PDU session management message to the SMF network element, where the PDU session management message carries the transmission capability information of the access network device and the PDU session establishment request.

For example, the AMF network element may prestore transmission capability information of some access network devices. In this case, when receiving the PDU session establishment request from the terminal device, the AMF network element obtains, from a local UE context, a transmission capability of the access network device that serves the terminal device that initiates a PDU session. Alternatively, the UE context of the AMF network element does not include transmission capability information of any access network device. After receiving the PDU session establishment request from the terminal device, the AMF network element obtains the transmission capability information of the access network device from a network element such as the access network device.

For example, after receiving the PDU session establishment request, the AMF network element determines the access network device based on the PDU session establishment request, sends a request message to the access network device to request the transmission capability information, and then receives the transmission capability information from the access network device. Alternatively, when receiving the PDU session establishment request, the AMF network element receives the transmission capability information from the access network device.

For another example, the AMF network element receives the identifier of the access network device from the access network device, and obtains the transmission capability information of the access network device based on the identifier of the access network device.

For still another example, the AMF network element obtains transport layer association information of the access network device, and obtains the transmission capability information of the access network device based on the transport layer association information.

For still another example, the AMF network element obtains location information of the terminal device, and obtains the transmission capability information of the access network device based on the location information, where the access network device is an access network device that serves the terminal device. The location information may be geographical coordinates or the like.

In an embodiment, the AMF network element may obtain the transmission capability information of the access network device from the AMF network element locally or another network element in a registration process or a PDU session establishment process of the terminal device, to flexibly obtain the transmission capability information of the access network device.

In another feasible design, when the access network device satisfies a preset condition, the AMF network element obtains the transmission capability information of the access network device. For example, the access network device is faulty. Before a fault occurs, the access network device supports satellite transmission and optical fiber transmission. Due to an earthquake or the like, an optical fiber transmission network between the access network device and the UPF network element is faulty. After the fault occurs, the access network device supports satellite transmission. For another example, the access network device is faulty. Before a fault occurs, the access network device supports optical fiber transmission. Due to an earthquake or the like, an optical fiber transmission network between the access network device and the UPF network element is faulty. After the fault occurs, the access network device is upgraded to support satellite transmission. In the two scenarios, all terminal devices served by the access network device are affected. Therefore, this design may be understood as a node-level scenario. In this design, in operation 201, when the access network device satisfies the preset condition, the AMF network element obtains the transmission capability information of the access network device, where for example, a transmission capability information is actively reported by the access network device to the AMF network element. In operation 202, the AMF network element sends the transmission capability information of the access network device to the SMF network element by using an N11 message. Correspondingly, the SMF network element receives the N11 message that is from the AMF network element and that carries the transmission capability information of the access network device.

It should be noted that the AMF network element may alternatively send the transmission capability information of the access network device to the SMF network element by using another message.

In an embodiment, the AMF network element sends the transmission capability information of the access network device to the SMF network element by using the PDU session management message, to satisfy the UE-level or PDU session-level scenario; or the AMF network element sends the transmission capability information of the access network device to the SMF network element by using the N11 message, to satisfy the node-level scenario.

Figure 3B:
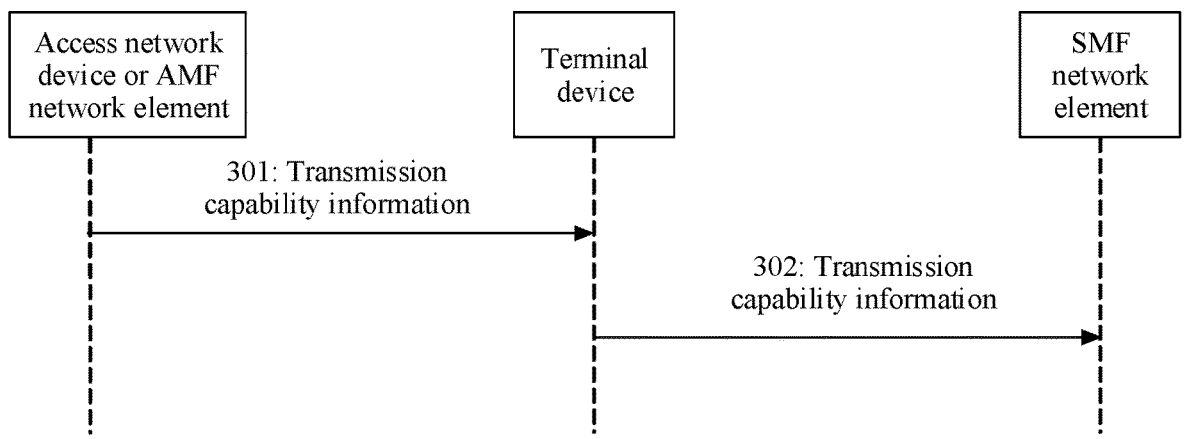
FIG. 3B is another schematic diagram of receiving transmission capability information by an SMF network element in a network node selection method according to an embodiment of this application.

FIG. 3B is another schematic diagram of receiving transmission capability information by an SMF network element in a network node selection method according to an embodiment of this application. Referring to FIG. 3B, an embodiment includes the following operations.

301: A terminal device receives transmission capability information of an access network device.

For example, the terminal device may obtain the transmission capability information of the access network device from the access network device, or obtain the transmission capability information of the access network device from an AMF network element in a registration process.

302: The terminal device sends the transmission capability information to a session management function SMF network element.

Correspondingly, the SMF receives the transmission capability information of the access network device from the terminal device.

For example, the terminal device sends the transmission capability information of the access network device to the AMF network element, and the AMF network element transparently transmits the transmission capability information to the SMF network element.

In an embodiment, the transmission capability information of the access network device received by the SMF network element is obtained by the AMF network element and sent to the SMF network element, or is obtained by the terminal device and sent to the SMF network element, so that the SMF flexibly obtains the transmission capability information of the access network device.

In the foregoing embodiment, after receiving the transmission capability information of the access network device, the SMF network element further sends second indication information to the access network device, to indicate the access network device to send an access control message to the terminal device.

In an embodiment, the SMF network element sends the second indication information to the access network device based on the transmission capability information of the access network device, where the second indication information is used to indicate the access network device to send the access control message to the terminal device. This design is for a scenario in which no PCF network element is deployed in a system architecture. For example, if the transmission capability information is satellite communication transmission, and the SMF network element determines that service data needs to be transmitted through an optical fiber, the SMF network element sends the second indication information to the access network device, so that the access network device sends, to the terminal device, an access control message for rejecting access, or the access network device activates an access control mechanism, for example, only UE is allowed to initiate a PDU session or UE is allowed to initiate a PDU session of a service.

In another feasible design, the SMF network element receives access control policy information from a PCF network element, and sends second indication information to the access network device based on the access control policy information, where the second indication information is used to indicate the access network device to send an access control message to the terminal device. This design is for a scenario in which the PCF network element is deployed in a system architecture.

In an embodiment, after receiving the transmission capability information of the access network device, the SMF network element determines the second indication information; or receives an access control policy of the PCF network element, determines the second indication information according to the access control policy, and sends the second indication information to the access network device, so that the access network device controls access of the terminal device based on the second indication information, to control access of the terminal device based on a transmission capability of the access network device.

The following describes in detail the foregoing network node selection method by using several examples. For example, refer to FIG. 4A to FIG. 6.

Figure 4A:
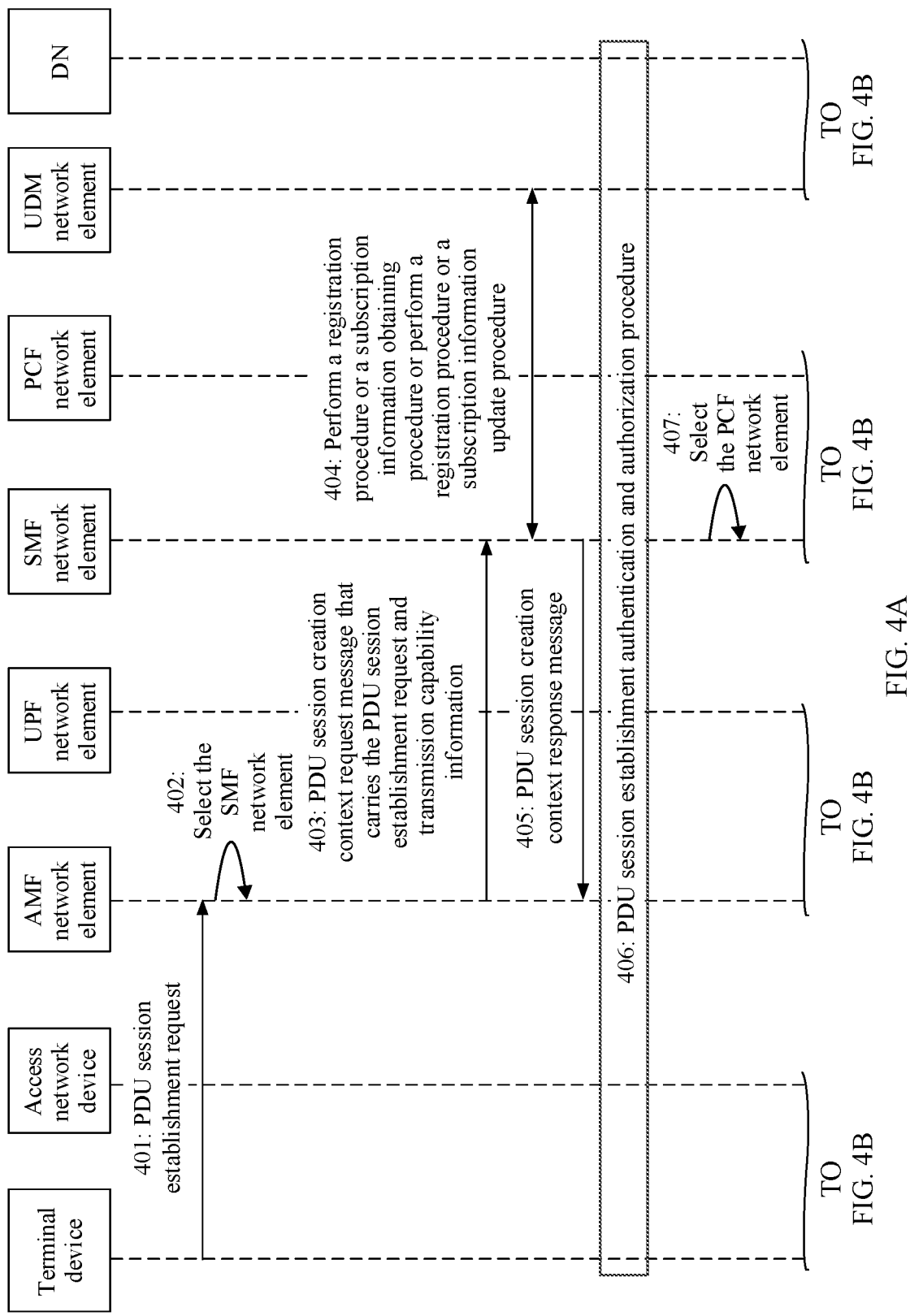
FIG. 4A, FIG. 4B, and FIG. 4C are another flowchart of a network node selection method according to an embodiment of this application.
Figure 4B:
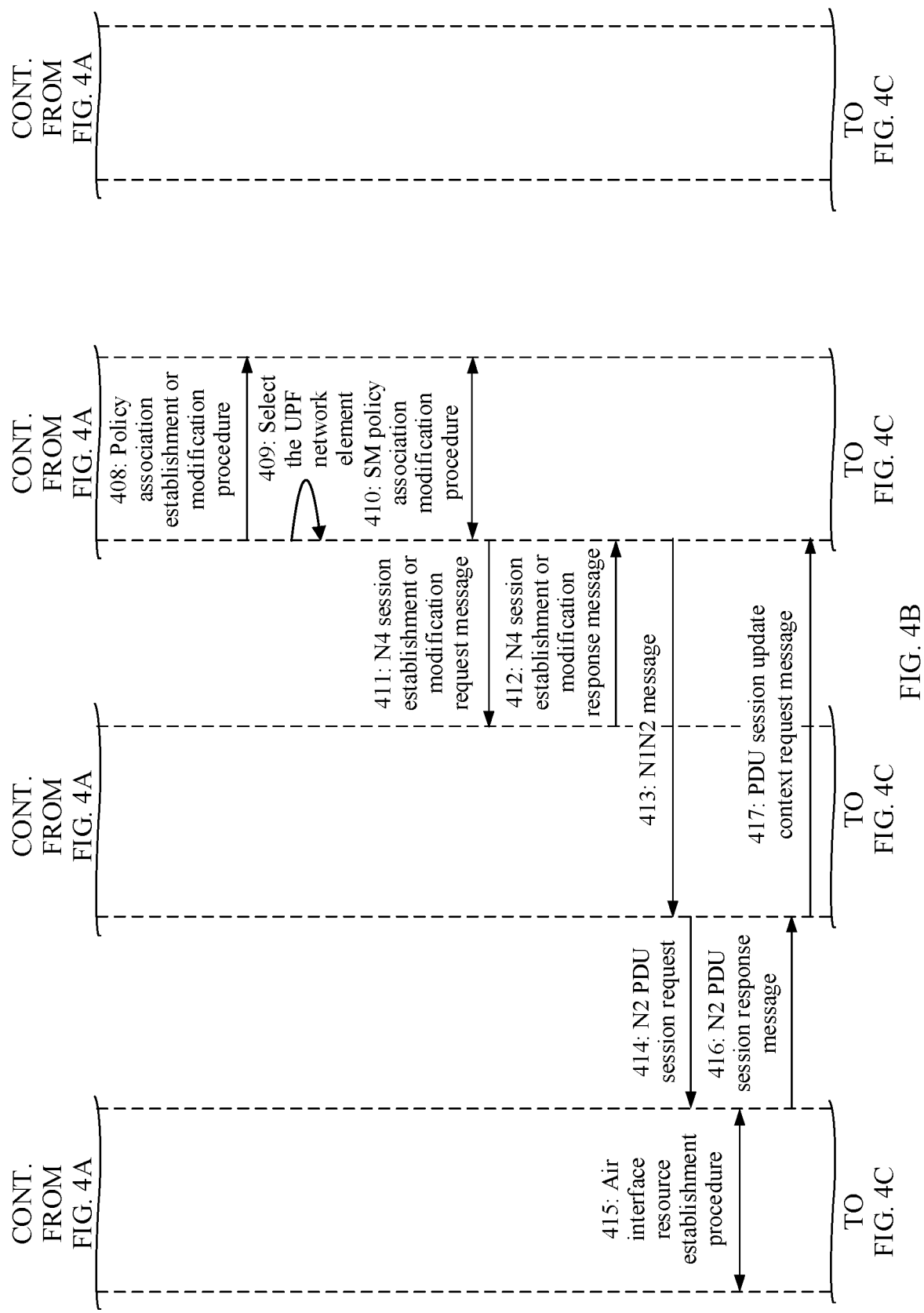
Figure 4C:
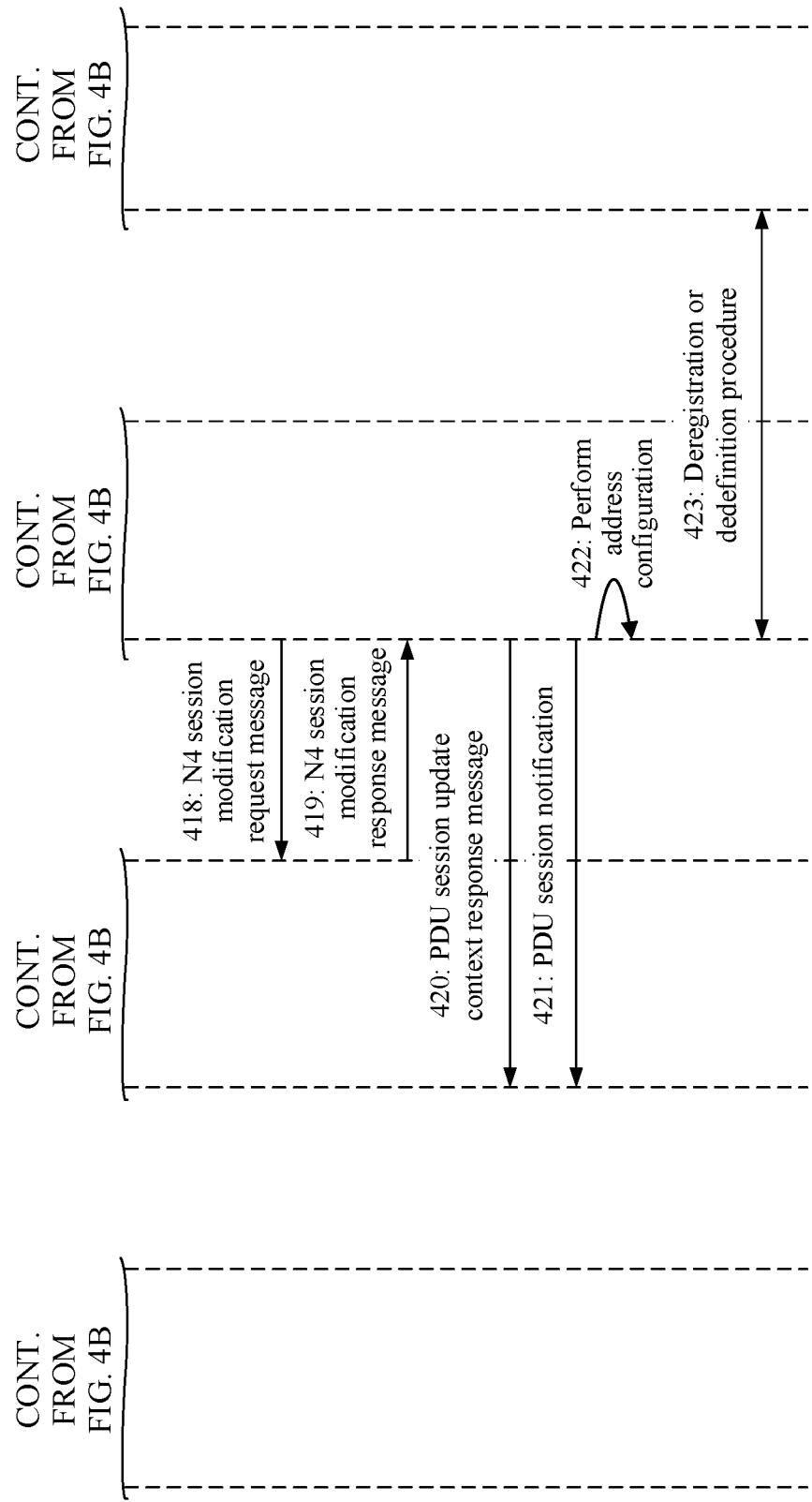

FIG. 4A, FIG. 4B, and FIG. 4C are another flowchart of a network node selection method according to an embodiment of this application. In an embodiment, transmission capability information of an access network device received by an SMF network element is from an AMF network element. An embodiment includes the following operations.

401: A terminal device sends a PDU session establishment request to the AMF network element.

Correspondingly, the AMF network element receives the PDU session establishment request. The PDU session establishment request includes a data network name (DNN), single network slice selection assistance information (S-NSSAI), and the like.

402: The AMF network element selects the SMF network element.

For example, an NRF network element stores information related to the SMF network element, and the related information includes an identifier of a UPF network element managed by the SMF network element and a transmission capability of each UPF network element. After receiving the transmission capability information of the access network device, the AMF network element may send the transmission capability information to the network repository function NRF network element, so that the NRF network element determines at least one SMF network element based on the transmission capability information, and sends third indication information to the AMF network element. Correspondingly, the AMF network element receives the third indication information from the NRF network element, where the third indication information is used to indicate the at least one SMF network element, and each of the at least one SMF network element satisfies the following condition: The SMF network element manages a plurality of UPF network elements, and the plurality of UPF network elements include a UPF network element that supports at least one transmission capability or all transmission capabilities in the transmission capability information. For example, if the transmission capability information of the access network device indicates that the access network device supports only a satellite communication capability, each of the at least one SMF network elements indicated by the third indication information satisfies the following condition: At least one of the plurality of UPF network elements managed by the SMF network element supports the satellite communication capability. Then, the AMF network element selects one SMF network element from the at least one SMF network elements.

403: The AMF network element sends a PDU session creation context request message to the SMF network element, where the PDU session creation context request message carries the PDU session establishment request and the transmission capability information.

In this operation, the AMF network element sends a PDU session management message to the SMF network element selected in operation 402, where the PDU session management message is the PDU session creation context request message. In a service-based architecture, the PDU session creation context request message is an Nsmf_PDUSession_CreateSMContextRequest message.

404: The SMF network element and a UDM network element perform a registration procedure or a subscription information obtaining procedure, or perform a registration procedure or a subscription information update procedure.

405: The SMF network element sends a PDU session creation context response message to the AMF network element.

In the service-based architecture, the PDU session creation context response message is an Nsmf_PDUSession_Create SMContext Response message.

406: The SMF network element initiates a PDU session establishment authentication and authorization procedure.

For example, when the SMF network element needs to perform authentication and authorization, the SMF network element initiates the PDU session establishment authentication and authorization procedure.

407: The SMF network element selects a PCF network element.

408: The SMF network element and the selected PCF network element perform a session management (SM) policy association establishment procedure or an SM policy association modification procedure.

In operations 407 and 408, the SMF network element provides the transmission capability information of the access network device for the PCF network element, so that the PCF network element determines a PDU session of a transmission capability to be used. If determining that establishment of the PDU session of the transmission capability supported by the access network device is not allowed, the PCF indicates the SMF network element to reject the establishment of the PDU session, and sends a cause value to the terminal device, so that the terminal device initiates no PDU session establishment request any longer.

409: The SMF network element selects a UPF network element.

In this operation, the SMF network element selects the UPF network element for the terminal device based on the transmission capability information of the access network device.

For example, the SMF network element manages a plurality of UPF network elements, and knows transmission capabilities of the UPF network elements. If there are at least two transmission capabilities of the access network device, the SMF network element first selects one transmission capability, which is referred to as a target transmission capability or a transmission capability below, from the transmission capabilities. Then, the SMF network element selects, from the plurality of UPF network elements based on the target transmission capability, the UPF network element that supports the target transmission capability.

In an embodiment, that the SMF network element selects the user plane function UPF network element for the terminal device based on the transmission capability information of the access network device includes: The SMF network element selects the UPF network element for the terminal device based on a local policy and the transmission capability information of the access network device.

In an embodiment, no PCF network element is deployed in a system architecture, and the local policy is, for example, a priority policy or a DN requirement policy (for example, supporting LEO satellite transmission). For example, the local policy indicates to select a satellite communication capability. If the transmission capability information of the access network device includes an optical fiber communication capability and the satellite communication capability, the SMF network element uses the satellite communication capability as a target capability, and a finally selected UPF network element supports the satellite communication capability.

In an embodiment, the SMF network element selects the target transmission capability and then selects the UPF network element based on the target transmission capability, to select the UPF network element for the terminal device in the system architecture in which no PCF network element is deployed.

In an embodiment, that the SMF network element selects the user plane function UPF network element for the terminal device based on the transmission capability information of the access network device includes: The SMF network element sends the transmission capability information of the access network device to a policy control function PCF network element, where the transmission capability information is used by the PCF network element to determine a target transmission capability, and the target transmission capability belongs to at least one transmission capability included in the transmission capability information of the access network device; the SMF network element receives first indication information from the PCF network element, where the first indication information is used to indicate the target transmission capability; the SMF network element selects the UPF network element for the terminal device based on the target transmission capability.

In an embodiment, the PCF network element is deployed in a system architecture, and the PCF network element selects the target transmission capability from the at least one transmission capability included in the transmission capability information, and indicates the target transmission capability to the SMF network element.

In an embodiment, the PCF network element selects the target transmission capability and indicates the target transmission capability to the SMF network element, so that the SMF network element selects the UPF network element based on the target transmission capability. Therefore, the PCF network element deployed in the system architecture selects the UPF network element for the terminal device.

410: The SMF network element initiates the SM policy association modification procedure to the PCF network element.

411: The SMF network element sends an N4 session establishment or modification request message to the UPF network element.

412: The SMF network element receives an N4 session establishment or modification response message from the UPF network element.

413: The SMF network element sends an N1N2 message to the AMF network element.

The N1N2 message is a Namf_Communication_N1N2MessageTransfer message in the service-based architecture, and the N1N2 message includes an N1 SM container and N2 SM information. In an embodiment, the N2 SM information includes indication information that is selected by the SMF network element and that indicates the target transmission capability, so that the access network device determines the target transmission capability based on the indication information, and transmits a data packet by using the target transmission capability.

414: The AMF network element sends an N2 PDU session request to the access network device.

Correspondingly, the access network device receives the N2 PDU session request, where the N2 PDU session request includes the N2 SM information and a NAS message, and the NAS message includes the N1 SM container. If the N2 SM information in operation 413 includes the indication information used to indicate the target transmission capability, in this operation, the N2 SM information also includes the indication information used to indicate the target transmission capability.

415: The access network device and the terminal device perform an air interface resource establishment procedure.

416: The access network device sends an N2 PDU session response message to the AMF network element.

The N2 PDU session response message includes a PDU session identifier (ID), N2 SM information, and the like.

417: The AMF network element sends a PDU session update context request message to the SMF network element.

In the service-based architecture, the PDU session update context request message is an Nsmf_PDUSession_UpdateSMContext Request message, which includes N2 SM information.

418: The SMF network element sends an N4 session modification request message to the UPF network element.

419: The SMF network element receives an N4 session modification response message from the UPF network element.

420: The SMF network element sends a PDU session update context response message to the AMF network element.

In the service-based architecture, the PDU session update context response message is an Nsmf_PDUSession_UpdateSMContext Response message, and the PDU session update context response message includes N2 SM information.

421: The SMF network element sends a PDU session notification to the AMF network element.

In the service-based architecture, the PDU session notification is Nsmf_PDUSession_SMContextStatusNotify.

It should be noted that, this operation is an optional operation.

422: The SMF network element performs address configuration.

In this operation, the SMF network element performs address configuration for an IPv4v6- or IPv6-type PDU session.

423: The SMF network element and the UDM network element perform a deregistration or dedefinition procedure.

In this operation, if a PDU session fails to be established, the SMF network element and the UDM network element perform the deregistration or dedefinition procedure.

In an embodiment, the SMF network element obtains the transmission capability information of the access network device through the AMF network element, and determines, based on the transmission capability information, a transmission capability, such as a transmission manner or a latency, corresponding to the PDU session, so that the SMF network element selects, based on the transmission capability corresponding to the PDU session, a UPF network element supporting the transmission capability. Therefore, in a scenario in which the access network device supports different transmission capabilities, the SMF network element selects the proper UPF network element for the PDU session.

Figure 5A:
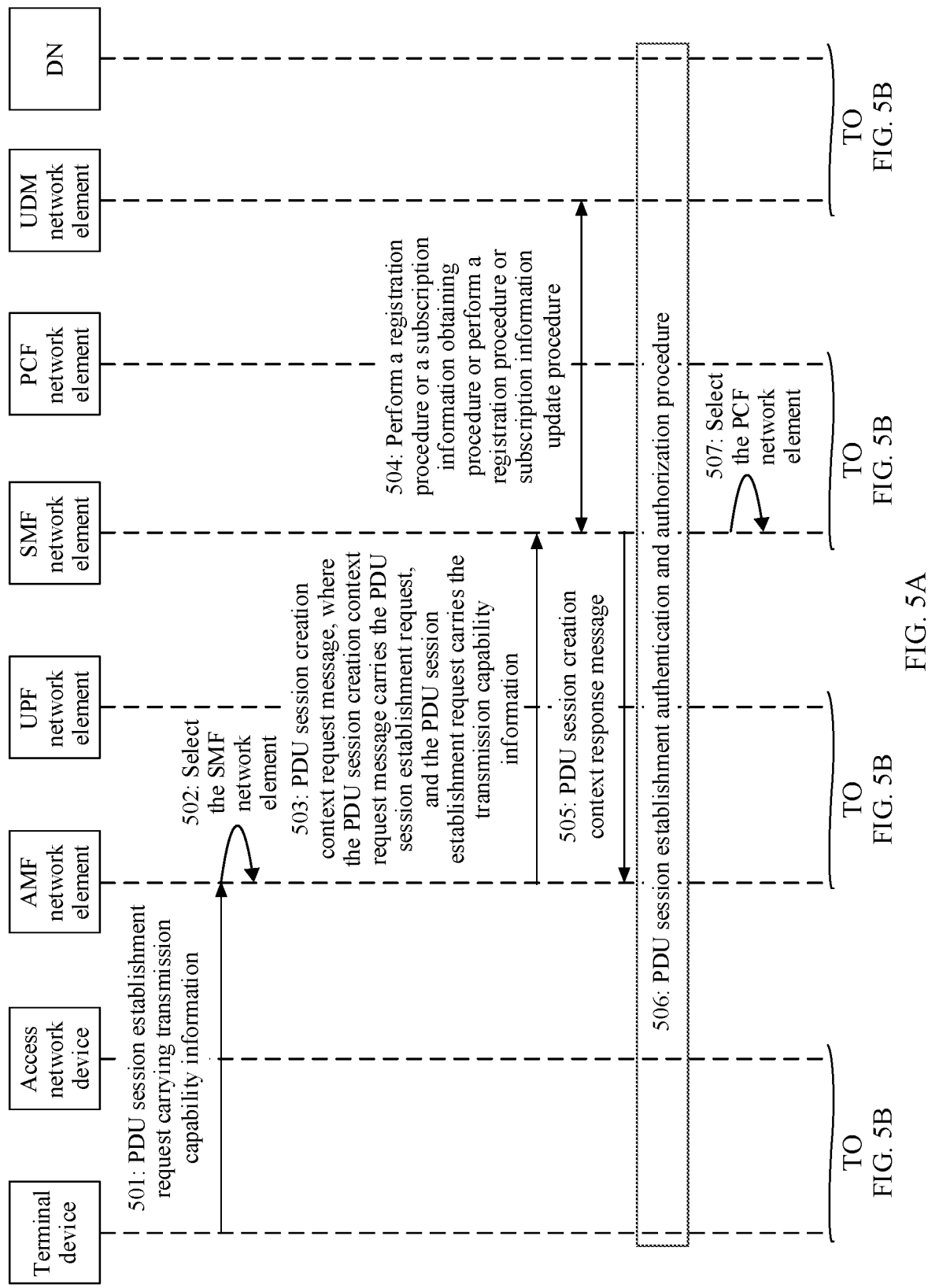

FIG. 5A, FIG. 5B, and FIG. 5C are still another flowchart of a network node selection method according to an embodiment of this application. In an embodiment, transmission capability information of an access network device received by an SMF network element is from a terminal device. An embodiment includes the following operations.

501: The terminal device sends a PDU session establishment request to an AMF network element.

A difference between this operation and the foregoing operation 401 lies in that, in this operation, in addition to carrying the DNN and the S-NSSAI, the PDU session establishment request further carries the transmission capability information of the access network device, and the access network device is an access network device that serves the terminal device. The terminal device may obtain the transmission capability information from the access network device, or obtain the transmission capability information of the access network device from the AMF network element in a registration process.

502: The AMF network element selects the SMF network element.

For details, refer to the description of operation 501. Details are not described herein again.

503: The AMF network element sends a PDU session creation context request message to the SMF network element, where the PDU session creation context request message carries the PDU session establishment request, and the PDU session establishment request carries the transmission capability information.

A difference between this operation and the foregoing operation 403 lies in that, in this operation, the transmission capability information is carried in the PDU session establishment request, and in operation 403, the transmission capability information and the PDU session establishment request are independent of each other.

504: The SMF network element and a UDM network element perform a registration procedure or a subscription information obtaining procedure, or perform a registration procedure or a subscription information update procedure.

505: The SMF network element sends a PDU session creation context response message to the AMF network element.

For details, refer to the description of operation 405. Details are not described herein again.

506: The SMF network element initiates a PDU session establishment authentication and authorization procedure.

For example, when the SMF network element needs to perform authentication and authorization, the SMF network element initiates the PDU session establishment authentication and authorization procedure.

507: The SMF network element selects a PCF network element.

508: The SMF network element and the selected PCF network element perform a session management (SM) policy association establishment procedure or an SM policy association modification procedure.

For details, refer to the description of operation 408. Details are not described herein again.

509: The SMF network element selects a UPF network element.

For details, refer to the description of operation 409. Details are not described herein again.

510: The SMF network element initiates the SM policy association modification procedure to the PCF network element.

511: The SMF network element sends an N4 session establishment or modification request message to the UPF network element.

512: The SMF network element receives an N4 session establishment or modification response message from the UPF network element.

513: The SMF network element sends an N1N2 message to the AMF network element.

For details, refer to the description of operation 413. Details are not described herein again.

514: The AMF network element sends an N2 PDU session request to the access network device.

For details, refer to the description of operation 414. Details are not described herein again.

515: The access network device and the terminal device perform an air interface resource establishment procedure.

516: The access network device sends an N2 PDU session response message to the AMF network element.

The N2 PDU session response message includes a PDU session identifier (ID), N2 SM information, and the like.

517: The AMF network element sends a PDU session update request to the SMF network element.

For details, refer to the description of operation 417. Details are not described herein again.

518: The SMF network element sends an N4 session modification request message to the UPF network element.

519: The SMF network element receives an N4 session modification response message from the UPF network element.

520: The SMF network element sends a PDU session update context response message to the AMF network element.

For details, refer to the description of operation 420. Details are not described herein again.

521: The SMF network element sends a PDU session notification to the AMF network element.

For details, refer to the description of operation 421. Details are not described herein again.

522: The SMF network element performs address configuration.

In this operation, the SMF network element performs address configuration for an IPv4v6- or IPv6-type PDU session.

523: The SMF network element and the UDM network element perform a deregistration or dedefinition procedure.

In this operation, if a PDU session fails to be established, the SMF network element and the UDM network element perform the deregistration or dedefinition procedure.

In an embodiment, the SMF network element obtains the transmission capability information of the access network device through the terminal device, and determines, based on the transmission capability information, a transmission capability, such as a transmission manner or a latency, corresponding to the PDU session, so that the SMF network element selects, based on the transmission capability corresponding to the PDU session, a UPF network element supporting the transmission capability. Therefore, in a scenario in which the access network device supports different transmission capabilities, the SMF network element selects the proper UPF network element for the PDU session.

Figure 6:
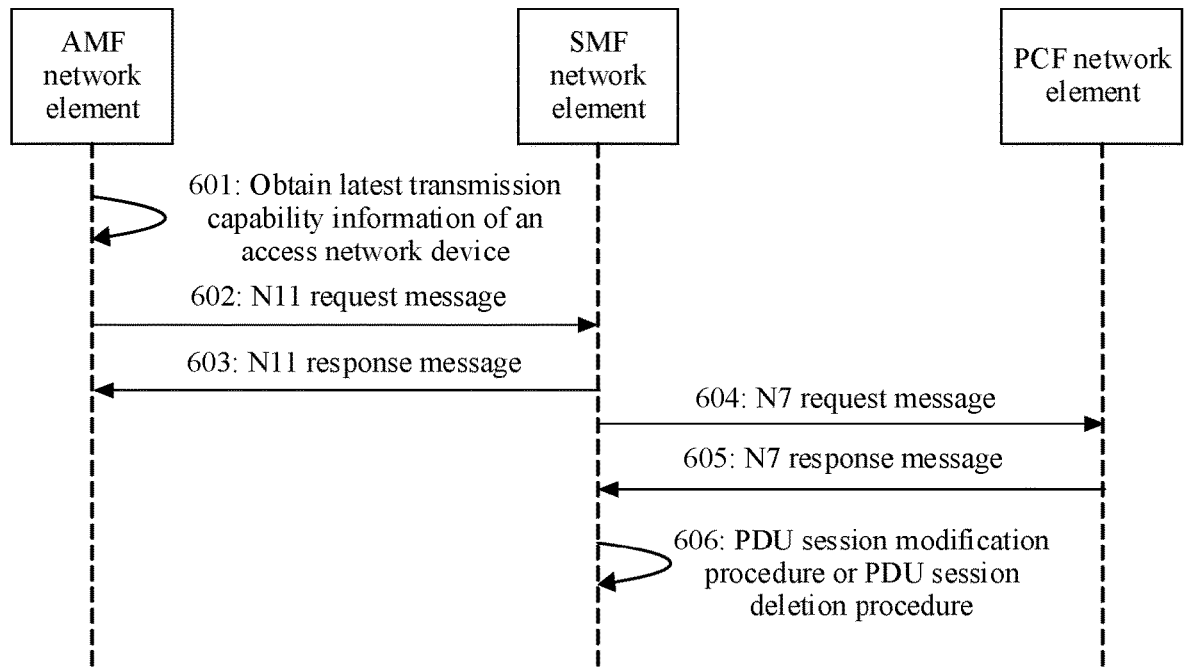
FIG. 6 is still another flowchart of a network node selection method according to an embodiment of this application.

FIG. 6 is still another flowchart of a network node selection method according to an embodiment of this application. An embodiment is applicable to a scenario in which a transmission capability of an access network device is updated after an SMF network element determines a UPF network element based on transmission capability information of the access network device. An embodiment includes the following operations.

601: An AMF network element obtains latest transmission capability information of the access network device.

In this operation, the AMF network element obtains the latest transmission capability information of the access network device based on a node-level configuration procedure or an N2 connection.

602: The AMF network element sends an N11 request message to the SMF network element.

In this operation, the AMF network element sends the N11 request message to all SMF network elements that establish connections to the access network device, where the N11 request message includes the latest transmission capability information of the access network device, and the N11 request message is a node-level message.

603: The SMF network element sends an N11 response message to the AMF network element.

604: The SMF network element sends an N7 request message to a PCF network element.

Correspondingly, the PCF network element receives the N7 request message.

In this operation, the SMF network element selects the PCF network element based on the latest transmission capability information, and sends the N7 request message to the selected PCF network element, where the N7 request message carries the latest transmission capability information of the access network device. The N7 request message is a node-level message or a PDU session-level message.

605: The PCF network element sends an N7 response message to the SMF network element.

If the N7 request message in operation 604 is the PDU session-level message, the N7 response message in this operation is used to indicate whether a PDU session can use the access network device whose transmission capability is updated.

If the N7 request message in operation 604 is the node-level message, in this operation, the PCF network element sends an update policy to all the related SMF network elements, so that the SMF network elements initiate a PDU session modification procedure or a PDU session deletion procedure.

606: The SMF network element initiates the PDU session modification procedure or the PDU session deletion procedure.

The initiation of the PDU session modification procedure means that the SMF network element selects a new UPF network element and establishes a PDU session according to a local policy or a policy sent by the SMF network element.

In an embodiment, if the transmission capability of the access network device is updated, the SMF network element determines, based on the latest transmission capability information of the access network device, to delete the PDU session or modify the PDU session.

In the foregoing embodiments, the SMF network element manages at least one UPF network element, and the SMF network element pre-obtains and stores a transmission capability of each UPF network element. Then, after receiving the transmission capability information of the access network device, the SMF network element determines a target transmission capability based on the local policy or the PCF network element determines the target transmission capability, and the SMF network element selects, from the at least one UPF network element based on the target transmission capability, a UPF network element that supports the target transmission capability. The following describes in detail how the SMF network element pre-obtains the transmission capability of the at least one UPF network element.

In an embodiment, the SMF network element obtains transmission capability information of the at least one UPF network element through an NRF network element. In an embodiment, the transmission capability of the at least one UPF network element is configured on the NRF network element, and the SMF network element obtains, through the NRF network element, a UPF network element that has a transmission capability or the transmission capability of the UPF network element. Alternatively, the transmission capability of the at least one UPF network element is configured on each UPF network element, and the UPF network element registers the transmission capability information with the NRF network element. The SMF network element obtains, through the NRF network element, a UPF network element that has a transmission capability or the transmission capability of the UPF network element. For example, refer to FIG. 7.

Figure 7:
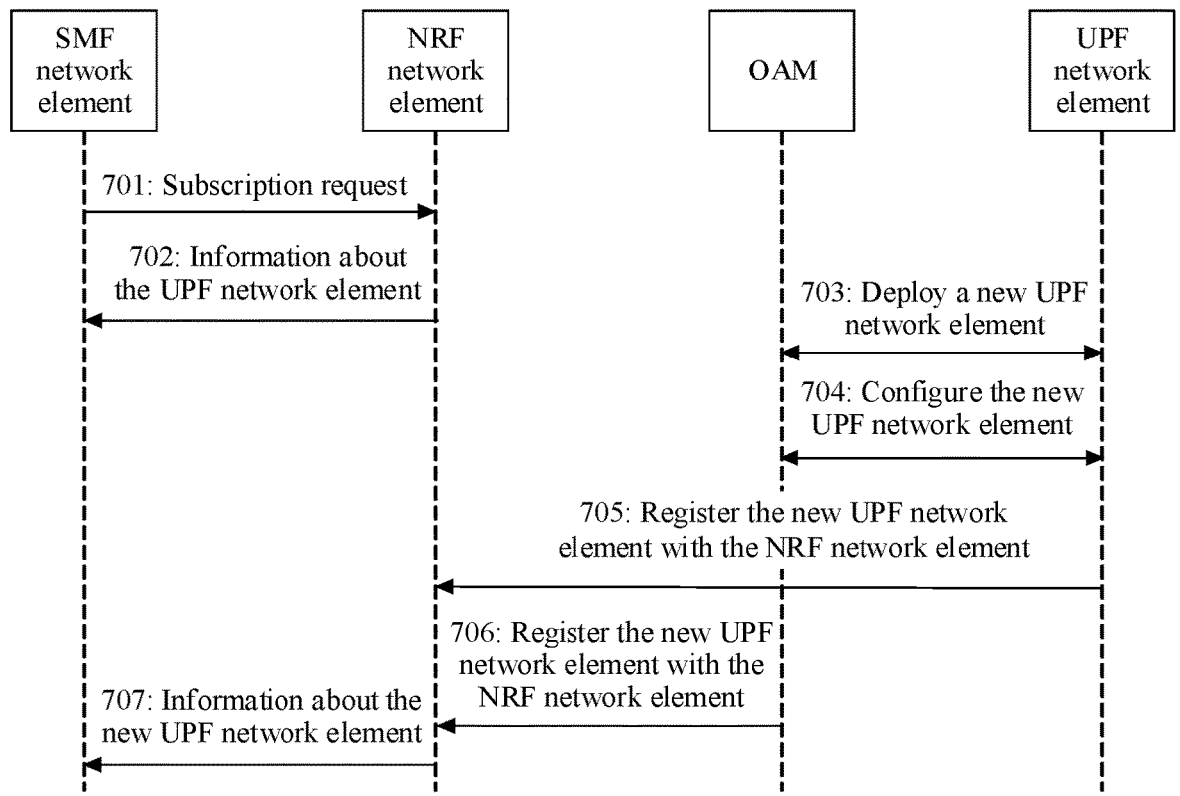
FIG. 7 is still another flowchart of a network node selection method according to an embodiment of this application.

FIG. 7 is still another flowchart of a network node selection method according to an embodiment of this application. An embodiment includes the following operations.

701: An SMF network element sends a subscription request to an NRF network element, where the subscription request is used to request information about a UPF network element, and the information about the UPF network element includes transmission capability information of the UPF network element.

Correspondingly, the NRF network element receives the subscription request from the SMF network element.

In an embodiment, the subscription request carries preset transmission capability information, the preset transmission capability information is included in UPF provision info, and the UPF provision info further includes an NDD and S-NSSAI of the UPF network element, an identifier of the SMF network element, and the like.

702: The NRF network element sends the information about the UPF network element to the SMF network element.

Correspondingly, the SMF network element receives the information about the UPF network element from the NRF network element, where the information about the UPF network element includes information about one or more UPF network elements, where the one or more UPF network elements are UPF network elements that are in at least one UPF network element managed by the SMF network element and that support a transmission capability indicated by the preset transmission capability information.

To deploy a new UPF network element, the following operations need to be performed.

703: An operation, administration and maintenance network element deploys the new UPF network element.

In this operation, a network management system is used to deploy the new UPF network element by using the operation, administration and maintenance (OAM) network element.

704: The operation, administration and maintenance network element configures the new UPF network element.

In this operation, an NRF ID and a transmission capability supported by the UPF network element are configured on the UPF network element, where the transmission capability supported by the UPF network element is included in the UPF provision info.

705: The UPF network element registers with the NRF.

In this operation, the UPF network element sends a registration message to the NRF network element, where the message includes a configuration of the UPF network element.

706: The OAM network element registers the new UPF network element with the NRF.

It should be noted that either operation 705 or operation 706 is selected, that is, only either of the operations needs to be performed.

707: The NRF network element sends the information about the UPF network element to the SMF network element, where the information about the UPF network element includes a transmission capability of at least one UPF network element.

If the subscription request further carries the preset transmission capability information in operation 701, in this operation, each UPF network element in the information about the UPF network element supports the preset transmission capability.

In an embodiment, the SMF network element obtains the transmission capability information of the UPF network element by performing an N4 node-level procedure with the UPF network element. For example, refer to FIG. 8A and FIG. 8B.

Figure 8A:
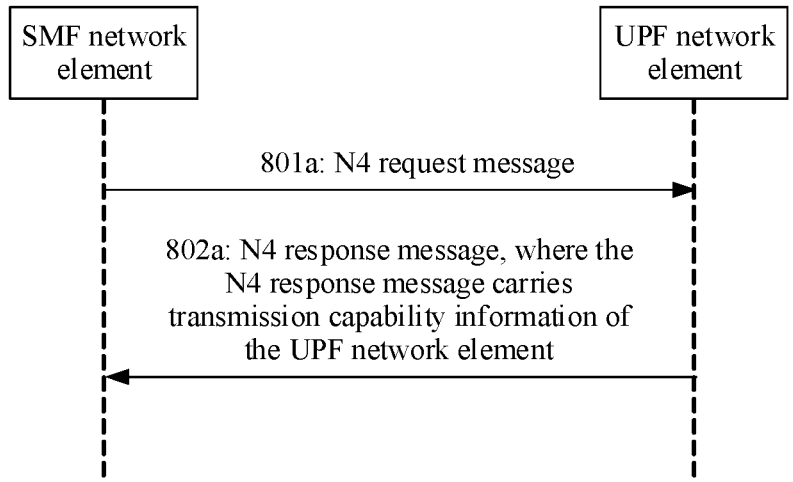
FIG. 8A is still another flowchart of a network node selection method according to an embodiment of this application.

FIG. 8A is still another flowchart of a network node selection method according to an embodiment of this application. An embodiment includes the following operations.

801a: An SMF network element sends an N4 request message to a UPF network element.

Correspondingly, the UPF network element receives the N4 request message from the SMF network element.

802a: The UPF network element sends an N4 response message to the SMF network element, where the N4 request message carries transmission capability information of the UPF network element.

In an embodiment, the SMF network element actively obtains the transmission capability information of the UPF network element by using an N4 association establishment or update request, so that the SMF network element obtains transmission capability information of at least one UPF network element.

Figure 8B:
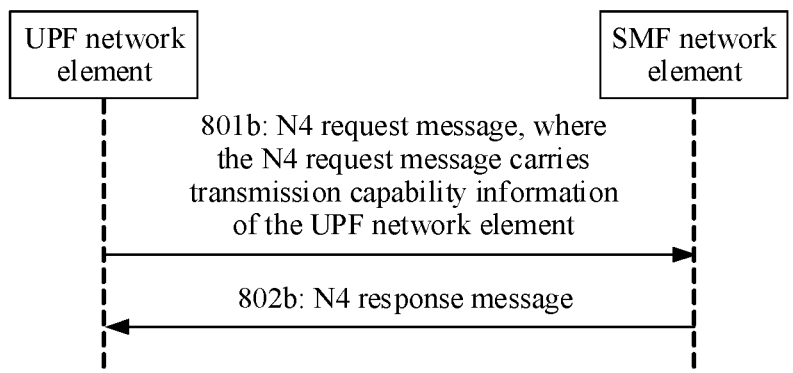
FIG. 8B is still another flowchart of a network node selection method according to an embodiment of this application.

FIG. 8B is still another flowchart of a network node selection method according to an embodiment of this application. An embodiment includes the following operations.

801b: A UPF network element sends an N4 request message to an SMF network element, where the N4 request message carries transmission capability information of the UPF network element.

Correspondingly, the SMF network element receives the N4 request message from the UPF network element.

802b: The SMF network element sends an N4 response message to the UPF network element.

In an embodiment, the UPF network element actively reports the transmission capability information of the UPF network element to the SMF network element by using an N4 association establishment or update request, so that the SMF network element obtains transmission capability information of at least one UPF network element.

Figure 9:
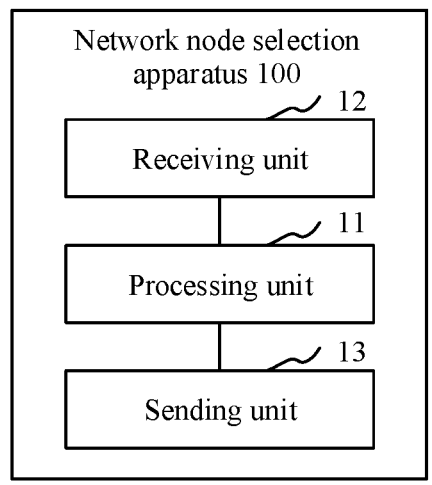
FIG. 9 is a schematic structural diagram of a network node selection apparatus according to an embodiment of this application.

FIG. 9 is a schematic structural diagram of a network node selection apparatus 100 according to an embodiment of this application. The network node selection apparatus in an embodiment may be an SMF network element, or may be a chip used in the SMF network element. The network node selection apparatus may be configured to perform a function of the SMF network element in the foregoing embodiment. As shown in FIG. 9, the network node selection apparatus 100 may include:

a processing unit 11, configured to: obtain transmission capability information of an access network device; and select a user plane function UPF network element for a terminal device based on the transmission capability information of the access network device, where the access network device is an access network device that serves the terminal device.

In a feasible design, the apparatus further includes a receiving unit 12. The processing unit 11 is configured to control the receiving unit 12 to receive the transmission capability information of the access network device from an access and mobility management function AMF network element; or the processing unit 11 is configured to control the receiving unit 12 to receive the transmission capability information of the access network device from the terminal device.

In an embodiment, when the transmission capability information of the access network device is from the AMF network element, the receiving unit 12 is configured to receive a packet data unit PDU session management message from the AMF network element, where the PDU session management message carries the transmission capability information of the access network device; or the receiving unit 12 is configured to receive an N11 message from the AMF network element, where the N11 message carries the transmission capability information of the access network device.

In an embodiment, when the transmission capability information of the access network device is from the terminal device, the receiving unit 12 is configured to receive a non-access stratum NAS message from the terminal device, where the NAS message carries the transmission capability information of the access network device.

In an embodiment, the processing unit 11 is configured to select the UPF network element for the terminal device based on a local policy and the transmission capability information of the access network device.

In an embodiment, the apparatus 100 further includes:

a sending unit 13, configured to send the transmission capability information of the access network device to a policy control function PCF network element, where the transmission capability information of the access network device is used by the PCF network element to determine a target transmission capability, where the receiving unit 12 is configured to receive first indication information from the PCF network element, where the first indication information is used to indicate the target transmission capability; and the processing unit 11 is configured to select the UPF network element for the terminal device based on the target transmission capability.

In an embodiment, the processing unit 11 is configured to: obtain transmission capability information of at least one UPF network element; and select, for the terminal device based on the transmission capability information of the at least one UPF network element, the UPF network element that supports the target transmission capability.

In an embodiment, the sending unit 13 is configured to send a subscription request to a network repository function NRF network element, where the subscription request is used to request information about the UPF network element, and the information about the UPF network element includes transmission capability information of the UPF network element; and the receiving unit 12 is further configured to receive the information about the UPF network element from the NRF network element.

In an embodiment, the subscription request carries preset transmission capability information, and the UPF network element is a UPF network element that is in at least one UPF network element managed by the SMF network element and that supports a transmission capability indicated by the preset transmission capability information.

In an embodiment, the sending unit 13 is configured to send an N4 request message to the UPF network element, and the receiving unit 12 is further configured to receive an N4 response message from the UPF network element, where the N4 response message carries the transmission capability information of the UPF network element; or the receiving unit 12 is configured to receive an N4 request message from the UPF network element, where the N4 request message carries the transmission capability information of the UPF network element.

In an embodiment, the sending unit 13 is configured to send second indication information to the access network device based on the transmission capability information of the access network device, where the second indication information is used to indicate the access network device to send an access control message to the terminal device; or the receiving unit 12 is configured to receive access control policy information from the PCF network element, and the sending unit 13 is configured to send second indication information to the access network device based on the access control policy information, where the second indication information is used to indicate the access network device to send an access control message to the terminal device.

The network node selection apparatus provided in an embodiment of the application may perform actions of the SMF network element in the foregoing embodiment. An implementation principle and a technical effect of the network node selection apparatus are similar to those of the foregoing embodiment. Details are not described herein again.

Figure 10:
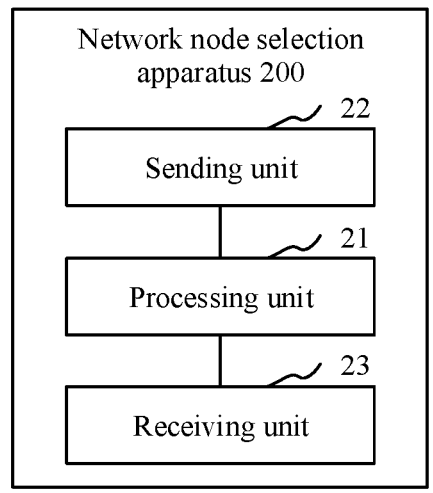
FIG. 10 is another schematic structural diagram of a network node selection apparatus according to an embodiment of this application.

FIG. 10 is another schematic structural diagram of a network node selection apparatus 200 according to an embodiment of this application. The network node selection apparatus in an embodiment may be an AMF network element, or may be a chip used in the AMF network element. The network node selection apparatus may be configured to perform a function of the AMF network element in the foregoing embodiment. As shown in FIG. 10, the network node selection apparatus 200 may include:

a processing unit 21, configured to obtain transmission capability information of an access network device, where the transmission capability information includes at least one transmission capability; and a sending unit 22, configured to send the transmission capability information to a session management function SMF network element.

In an embodiment, the processing unit 21 is further configured to select the SMF network element based on the transmission capability information of the access network device.

In an embodiment, the apparatus 200 further includes a receiving unit 23, where the sending unit 22 is configured to send the transmission capability information of the access network device to a network repository function NRF network element, where the transmission capability information of the access network device is used by the NRF network element to determine at least one target SMF network element;

the receiving unit 23 is configured to receive third indication information from the NRF network element, where the third indication information is used to indicate the at least one target SMF network element; and the processing unit 21 is configured to determine the SMF network element in the at least one target SMF network element.

In an embodiment, the sending unit 22 is configured to send a PDU session management message to the SMF network element, where the PDU session management message carries a PDU session establishment request and the transmission capability information of the access network device, the PDU session establishment request is used to request to establish a PDU session for a terminal device, and the access network device is an access network device that serves the terminal device.

In an embodiment, the receiving unit 23 is configured to receive the transmission capability information of the access network device; or the receiving unit 23 is configured to receive an identifier of the access network device from the access network device, and the processing unit 21 is configured to obtain the transmission capability information of the access network device based on the identifier of the access network device; or the processing unit 21 is configured to: obtain transport layer association information of the access network device, and obtain the transmission capability information of the access network device based on the transport layer association information; or the processing unit 21 is configured to: obtain location information of the terminal device, and obtain the transmission capability information of the access network device based on the location information, where the access network device is an access network device that serves the terminal device.

In an embodiment, the processing unit 21 is configured to: when the access network device satisfies a preset condition, obtain the transmission capability information of the access network device.

The network node selection apparatus provided in an embodiment of the application may perform actions of the AMF network element in the foregoing embodiment. An implementation principle and a technical effect of the network node selection apparatus are similar to those of the foregoing embodiment. Details are not described herein again.

Figure 11:
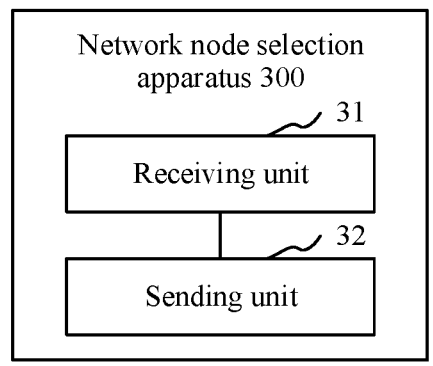
FIG. 11 is still another schematic structural diagram of a network node selection apparatus according to an embodiment of this application.

FIG. 11 is still another schematic structural diagram of a network node selection apparatus 300 according to an embodiment of this application. The network node selection apparatus in an embodiment may be a terminal device, or may be a chip used in the terminal device. The network node selection apparatus may be configured to perform a function of the terminal device in the foregoing embodiment. As shown in FIG. 11, the network node selection apparatus 300 may include:

- a receiving unit 31, configured to receive transmission capability information of an access network device; and
- a sending unit 32, configured to send the transmission capability information to a session management function SMF network element.

In an embodiment, the receiving unit 31 is configured to receive the transmission capability information from the access network device or an access and mobility management function AMF network element.

In an embodiment, the sending unit 32 is configured to send a non-access stratum NAS message to the SMF network element, where the NAS message carries the transmission capability information.

The network node selection apparatus provided in an embodiment of this application may perform actions of the terminal device in the foregoing embodiment. An implementation principle and a technical effect of the network node selection apparatus are similar to those of the foregoing embodiment. Details are not described herein again.

Figure 12:
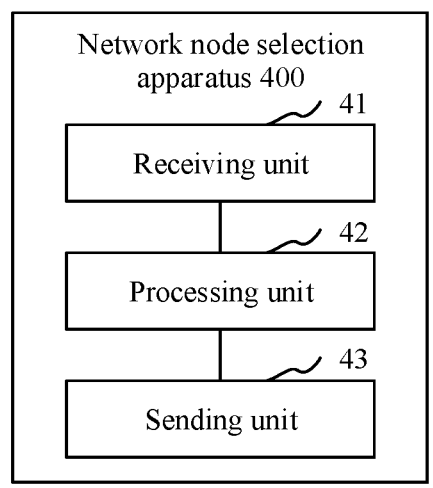
FIG. 12 is still another schematic structural diagram of a network node selection apparatus according to an embodiment of this application.

FIG. 12 is still another schematic structural diagram of a network node selection apparatus 400 according to an embodiment of this application. The network node selection apparatus in an embodiment may be a PCF network element, or may be a chip used in the PCF network element. The network node selection apparatus may be configured to perform a function of the PCF network element in the foregoing embodiment. As shown in FIG. 12, the network node selection apparatus 400 may include:

- a receiving unit 41, configured to receive transmission capability information of an access network device from a session management function SMF network element;
- a processing unit 42, configured to determine a target transmission capability based on the transmission capability information; and
- a sending unit 43, configured to send first indication information from the SMF network element, where the first indication information is used to indicate the target transmission capability.

In an embodiment, after sending the first indication information to the SMF network element, the sending unit 43 is further configured to send access control policy information to the SMF network element.

The network node selection apparatus provided in an embodiment of the application may perform actions of the PCF network element in the foregoing embodiment. An implementation principle and a technical effect of the network node selection apparatus are similar to those of the foregoing embodiment. Details are not described herein again.

It should be noted that, it should be understood that the receiving unit may be a receiver in an embodiment, and the sending unit may be a transmitter in an embodiment. The processing unit may be implemented in a form of software invoked by a processing element, or may be implemented in a form of hardware. For example, the processing unit may be a separately disposed processing element, or may be integrated into a chip of the foregoing apparatus for implementation. In addition, the processing unit may be stored in a memory of the foregoing apparatus in a form of program code, and invoked by a processing element of the foregoing apparatus to perform a function of the processing unit. In addition, all or some of the units may be integrated, or may be implemented independently. The processing element described herein may be an integrated circuit having a signal processing capability. In an implementation process, operations in the method or the units can be implemented by using a hardware integrated logical circuit in the processing element, or by using instructions in a form of software.

For example, the foregoing units may be configured as one or more integrated circuits for implementing the method, for example, one or more application-specific integrated circuits (ASIC), one or more microprocessors (DSP), or one or more field programmable gate arrays (FPGA). For another example, when one of the foregoing units is implemented by scheduling program code by a processing element, the processing element may be a general purpose processor, for example, a central processing unit (CPU) or another processor that can invoke the program code. For another example, the units may be integrated and implemented in a form of a system-on-a-chip (SOC).

Figure 13:
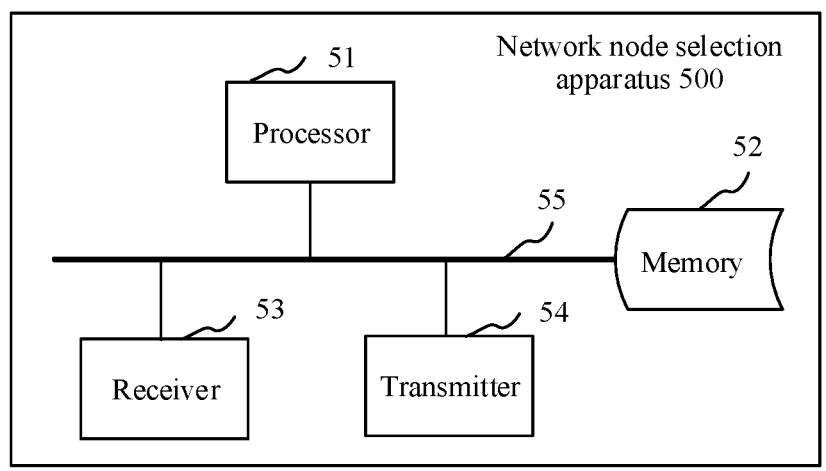
FIG. 13 is still another schematic structural diagram of a network node selection apparatus according to an embodiment of this application.

FIG. 13 is still another schematic structural diagram of a network node selection apparatus 500 according to an embodiment of this application. As shown in FIG. 13, the network node selection apparatus 500 may include a processor 51 (for example, a CPU), a memory 52, a receiver 53, and a transmitter 54. The receiver 53 and the transmitter 54 are coupled to the processor 51, the processor 51 controls a receiving action of the receiver 53, and the processor 51 controls a sending action of the transmitter 54. The memory 52 may include a high-speed random access memory (RAM), and may further include a non-volatile memory (NVM), for example, at least one magnetic disk storage. The memory 52 may store various instructions, to complete various processing functions and implement the operations of the method in this application. In an embodiment, the network node selection apparatus in this application may further include a communication bus 55. The receiver 53 and the transmitter 54 may be integrated into a transceiver of the network node selection apparatus, or may be an independent transceiver antenna of the network node selection apparatus. The communication bus 55 is configured to implement communication connection between the elements.

In an embodiment of the application, the memory 52 is configured to store computer-executable program code, and the program code includes instructions. When the processor 51 executes the instructions, the processor 51 of the network node selection apparatus is enabled to perform a processing action of the SMF network element in the foregoing method embodiment, the receiver 53 is enabled to perform a receiving action of the SMF network element in the foregoing method embodiment, and the transmitter 54 is enabled to perform a sending action of the SMF network element in the foregoing method embodiment. An implementation principle and a technical effect of the apparatus are similar to those of the method embodiment. Details are not described herein again. Alternatively, the memory 52 is configured to store computer-executable program code, and the program code includes instructions. When the processor 51 executes the instructions, the processor 51 of the network node selection apparatus is enabled to perform a processing action of the AMF network element in the foregoing method embodiment, the receiver 53 is enabled to perform a receiving action of the AMF network element in the foregoing method embodiment, and the transmitter 54 is enabled to perform a sending action of the AMF network element in the foregoing method embodiment. An implementation principle and a technical effect of the apparatus are similar to those of the method embodiment. Details are not described herein again. Alternatively, the memory 52 is configured to store computer-executable program code, and the program code includes instructions. When the processor 51 executes the instructions, the processor 51 of the network node selection apparatus is enabled to perform a processing action of the terminal device in the foregoing method embodiment, the receiver 53 is enabled to perform a receiving action of the terminal device in the foregoing method embodiment, and the transmitter 54 is enabled to perform a sending action of the terminal device in the foregoing method embodiment. An implementation principle and a technical effect of the apparatus are similar to those of the method embodiment. Details are not described herein again. Alternatively, the memory 52 is configured to store computer-executable program code, and the program code includes instructions. When the processor 51 executes the instructions, the processor 51 of the network node selection apparatus is enabled to perform a processing action of the PCF network element in the foregoing method embodiment, the receiver 53 is enabled to perform a receiving action of the PCF network element in the foregoing method embodiment, and the transmitter 54 is enabled to perform a sending action of the PCF network element in the foregoing method embodiment. An implementation principle and a technical effect of the apparatus are similar to those of the method embodiment. Details are not described herein again.

An embodiment of this application further provides a storage medium. The storage medium stores computer-executable instructions. When the computer-executable instructions are executed by a processor, the foregoing network node selection method is implemented.

An embodiment of the present disclosure further provides a computer program product. When the computer program product runs on an SMF network element, the SMF network element is enabled to perform the foregoing network node selection method; or when the computer program product runs on the AMF network element, the AMF network element is enabled to perform the foregoing network node selection method; or when the computer program product runs on a terminal device, the terminal device is enabled to perform the foregoing network node selection method; or when the computer program product runs on a PCF network element, the PCF network element is enabled to perform the foregoing network node selection method.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general purpose computer, a special purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

The term "a plurality of" in this specification refers to two or more than two. The term "and/or" in this specification describes only an association relationship for describing associated objects and represents that there may be three relationships. For example, A and/or B may represent three cases: There is only A, there are both A and B, and there is only B. In addition, the description "at least one of . . . " in this specification indicates one of listed items or any combination thereof. For example, "at least one of A, B, and C" may indicate the following six cases: Only A exists, only B exists, only C exists, both A and B exist, both B and C exist, both A and C exist, and A, B, and C all exist. In addition, the character "/" in this specification generally indicates an "or" relationship between the associated objects. In the formula, the character "/" indicates a "division" relationship between the associated objects.

It may be understood that various numbers in the embodiments of this application are merely used for differentiation for ease of description, and are not used to limit the scope of the embodiments of this application.

It may be understood that in the embodiments of this application, sequence numbers of the foregoing processes do not mean execution sequences. The execution sequences of the processes should be determined based on functions and internal logic of the processes, and should not be construed as any limitation on the implementation processes of the embodiments of this application.

What is claimed is:

1. A network node selection method, comprising:
   obtaining, by a session management function (SMF) network element, transmission capability information of an access network device; and
   selecting, by the SMF network element, a user plane function (UPF) network element for a terminal device based on the transmission capability information of the access network device that serves the terminal device.

2. The method according to claim 1, wherein the obtaining transmission capability information of the access network device comprises:
   receiving, by the SMF network element, the transmission capability information of the access network device from an access and mobility management function (AMF) network element; or receiving, by the SMF network element, the transmission capability information of the access network device from the terminal device.

3. The method according to claim 2, wherein the receiving the transmission capability information of the access network device from the access and mobility management function AMF network element comprises:
receiving, by the SMF network element, a PDU session management message from the AMF network element, wherein the PDU session management message carries the transmission capability information of the access network device; or
receiving, by the SMF network element, an N11 message from the AMF network element, wherein the N11 message carries the transmission capability information of the access network device.

4. The method according to claim 2, wherein the receiving the transmission capability information of the access network device from the terminal device comprises:
receiving, by the SMF network element, a non-access stratum (NAS) message from the terminal device, wherein the NAS message carries the transmission capability information of the access network device.

5. The method according to claim 1, wherein the selecting the user plane function (UPF) network element for the terminal device based on the transmission capability information of the access network device comprises:
selecting, by the SMF, the UPF network element for the terminal device based on a local policy and the transmission capability information of the access network device.

6. The method according to claim 1, wherein the selecting the user plane function UPF network element for the terminal device based on the transmission capability information of the access network device comprises:
sending, by the SMF network element, the transmission capability information of the access network device to a policy control function (PCF) network element, wherein the transmission capability information of the access network device is used by the PCF network element to determine a target transmission capability;
receiving, by the SMF network element, first indication information from the PCF network element, wherein the first indication information is used to indicate the target transmission capability; and
selecting, by the SMF network element, the UPF network element for the terminal device based on the target transmission capability.

7. The method according to claim 6, wherein the selecting the UPF network element for the terminal device based on the target transmission capability comprises:
obtaining, by the SMF network element, the transmission capability information of at least one UPF network element; and
selecting, by the SMF network element for the terminal device based on the transmission capability information of the at least one UPF network element, the UPF network element that supports the target transmission capability.

8. The method according to claim 1, further comprising:
sending, by the SMF network element, second indication information to the access network device based on the transmission capability information of the access network device, wherein the second indication information is used to indicate the access network device to send an access control message to the terminal device; or receiving, by the SMF network element, access control policy information from the PCF network element, and sending second indication information to the access network device based on the access control policy information, wherein the second indication information is used to indicate the access network device to send the access control message to the terminal device.

9. A network node selection method, comprising:
obtaining, by an access and mobility management function (AMF) network element, transmission capability information of an access network device; and
sending, by the AMF network element, the transmission capability information to a session management function (SMF) network element.

10. The method according to claim 9, further comprising:
selecting, by the AMF network element, the SMF network element based on the transmission capability information of the access network device.

11. The method according to claim 10, wherein the selecting the SMF network element based on the transmission capability information of the access network device comprises:
sending, by the AMF network element, the transmission capability information of the access network device to a network repository function (NRF) network element, wherein the transmission capability information of the access network device is used by the NRF network element to determine at least one target SMF network element;
receiving, by the AMF network element, third indication information from the NRF network element, wherein the third indication information is used to indicate the at least one target SMF network element; and
determining, by the AMF network element, the SMF network element in the at least one target SMF network element.

12. The method according to claim 9, wherein
the sending the transmission capability information to the session management function SMF network element comprises:
sending, by the AMF network element, a PDU session management message to the SMF network element, wherein the PDU session management message carries a PDU session establishment request and the transmission capability information of the access network device, wherein the PDU session establishment request is used to request to establish a PDU session for a terminal device, and wherein the access network device is the access network device that serves the terminal device.

13. The method according to claim 9, wherein the obtaining transmission capability information of the access network device comprises:
receiving, by the AMF network element, the transmission capability information of the access network device from the access network device; or
receiving, by the AMF network element, an identifier of the access network device from the access network device, and obtaining the transmission capability information of the access network device based on the identifier of the access network device; or
obtaining, by the AMF network element, transport layer association information of the access network device, and obtaining the transmission capability information of the access network device based on the transport layer association information; or obtaining, by the AMF network element, location information of a terminal device, and obtaining the transmission capability information of the access network device based on the location information, wherein the access network device is the access network device that serves the terminal device.

14. The method according to claim 9, wherein the obtaining transmission capability information of the access network device comprises:
when the access network device satisfies a preset condition, obtaining, by the AMF network element, the transmission capability information of the access network device.

15. A network node selection apparatus, comprising:
a processor and a memory;
the memory, configured to store instructions, and
the processor executes the instructions stored in the memory, so that the network node selection apparatus performs operations, the operations comprising:
obtaining transmission capability information of an access network device; and
selecting a user plane function (UPF) network element for a terminal device based on the transmission capability information of the access network device that serves the terminal device.

16. The apparatus according to claim 15, wherein the processor is further configured to:
receive the transmission capability information of the access network device from an access and mobility management function (AMF) network element; or
receive the transmission capability information of the access network device from the terminal device.

17. The apparatus according to claim 16, wherein when the transmission capability information of the access network device is from the AMF network element, the processor is further configured to:
receive a PDU session management message from the AMF network element, wherein the PDU session management message carries the transmission capability information of the access network device; or
receive an N11 message from the AMF network element, wherein the N11 message carries the transmission capability information of the access network device.

18. The apparatus according to claim 16, wherein when the transmission capability information of the access network device is from the terminal device, the processor is further configured to receive a non-access stratum (NAS) message from the terminal device, wherein the NAS message carries the transmission capability information of the access network device.

19. The apparatus according to claim 15, wherein
the processor is further configured to select the UPF network element for the terminal device based on a local policy and the transmission capability information of the access network device.

20. The apparatus according to claim 15, wherein the processor is further configured to:
send the transmission capability information of the access network device to a policy control function (PCF) network element, wherein the transmission capability information of the access network device is used by the PCF network element to determine a target transmission capability;
receive first indication information from the PCF network element, wherein the first indication information is used to indicate the target transmission capability; and
select the UPF network element for the terminal device based on the target transmission capability.

* * * * *